United States Patent
Birkland et al.

(10) Patent No.: US 11,753,016 B2
(45) Date of Patent: *Sep. 12, 2023

(54) METHOD AND SYSTEM FOR ESTIMATING SURFACE ROUGHNESS OF GROUND FOR AN OFF-ROAD VEHICLE TO CONTROL GROUND SPEED

(71) Applicant: Deere & Company, Moline, IL (US)

(72) Inventors: Christopher D. Birkland, Indianola, IA (US); Tyler D. Schleicher, Ankeny, IA (US)

(73) Assignee: Deere & Company, Moline, IL (US)

(*) Notice: Subject to any disclaimer, the term of this patent is extended or adjusted under 35 U.S.C. 154(b) by 83 days.

This patent is subject to a terminal disclaimer.

(21) Appl. No.: 16/946,849

(22) Filed: Jul. 9, 2020

(65) Prior Publication Data
US 2021/0284172 A1 Sep. 16, 2021

Related U.S. Application Data

(60) Provisional application No. 62/989,240, filed on Mar. 13, 2020.

(51) Int. Cl.
*B60W 40/06* (2012.01)
*B60W 10/04* (2006.01)
(Continued)

(52) U.S. Cl.
CPC ............ *B60W 40/06* (2013.01); *B60W 10/04* (2013.01); *B60W 10/30* (2013.01);
(Continued)

(58) Field of Classification Search
CPC ...... B60W 40/06; B60W 10/04; B60W 10/30; B60W 40/112; B60W 50/14;
(Continued)

(56) References Cited

U.S. PATENT DOCUMENTS 7,272,474 B1 9/2007 Stentz et al.
8,265,826 B2 * 9/2012 Feller ..................... G05D 1/027
701/472

(Continued)

FOREIGN PATENT DOCUMENTS

AU 2013303992 A1 4/2015
CN 103196823 A 7/2013
(Continued)

OTHER PUBLICATIONS

Extended European Search Report and Written Opinion issued in European Patent Application No. 21157580.8, dated Jul. 22, 2021, in 08 pages.

(Continued)

*Primary Examiner* — Babar Sarwar

(57) ABSTRACT

A method and system for estimating surface roughness of a ground for an off-road vehicle to control ground speed comprises detecting motion data of an off-road vehicle traversing a field or work site during a sampling interval. A pitch sensor is adapted to detect pitch data of the off-road vehicle for the sampling interval to obtain a pitch acceleration. A roll sensor is adapted to detect roll data of the off-road vehicle for the sampling interval to obtain a roll acceleration. An electronic data processor or surface roughness index module determines or estimates a surface roughness index based on the detected motion data, pitch data and roll data for the sampling interval. The surface roughness index can be displayed on the graphical display to a user or operator of the vehicle, or applied to control or execute a ground speed setting of the vehicle.

16 Claims, 11 Drawing Sheets

(51) Int. Cl.

| | | |
|---|---|---|
| *B60W 10/30* | (2006.01) | |
| *B60W 30/18* | (2012.01) | |
| *B60W 40/105* | (2012.01) | |
| *B60W 40/11* | (2012.01) | |
| *B60W 40/112* | (2012.01) | |
| *B60W 50/14* | (2020.01) | |
| *G01B 11/30* | (2006.01) | |
| *G01P 13/00* | (2006.01) | |
| *G01P 15/18* | (2013.01) | |
| *G01S 19/42* | (2010.01) | |
| *G01S 19/52* | (2010.01) | |
| *B60W 10/18* | (2012.01) | |

(52) U.S. Cl.
CPC .... *B60W 30/18009* (2013.01); *B60W 40/105* (2013.01); *B60W 40/11* (2013.01); *B60W 40/112* (2013.01); *B60W 50/14* (2013.01); *G01B 11/303* (2013.01); *G01P 13/00* (2013.01); *G01P 15/18* (2013.01); *G01S 19/42* (2013.01); *G01S 19/52* (2013.01); *B60W 10/18* (2013.01); *B60W 2050/146* (2013.01); *B60W 2420/42* (2013.01); *B60W 2520/16* (2013.01); *B60W 2520/18* (2013.01); *B60W 2552/35* (2020.02)

(58) Field of Classification Search
CPC ........... B60W 30/18009; B60W 40/11; B60W 40/105; B60W 2520/16; B60W 2520/18; B60W 2420/42; B60W 2552/35; B60W 2050/146; B60W 10/18; B60W 10/20; B60W 2520/10; B60W 2520/105; B60W 2556/50; B60W 2300/15; B60W 2710/20; G01P 15/18; G01P 13/00; G01S 19/52; G01S 19/42; G01B 11/303; B60G 17/0195; B60G 2400/0512; B60G 2400/0513; B60G 2400/204; B60G 2400/41; B62D 6/006; A01B 79/005; A01B 63/1112; E02F 9/2087; E02F 9/262
See application file for complete search history.

(56) References Cited

U.S. PATENT DOCUMENTS

| | | | |
|---|---|---|---|
| 8,340,438 B2 | 12/2012 | Anderson | |
| 9,516,802 B2 | 12/2016 | Zemenchik | |
| 9,615,501 B2 | 4/2017 | Pickett et al. | |
| 9,693,496 B2 | 7/2017 | Tevs et al. | |
| 9,708,001 B2 | 7/2017 | Arakane et al. | |
| 9,740,208 B2 | 8/2017 | Sugumaran et al. | |
| 10,114,376 B2* | 10/2018 | Kini | E02F 9/262 |
| 10,119,830 B2* | 11/2018 | Sakai | G01C 21/3667 |
| 10,126,136 B2 | 11/2018 | Iagnemma | |
| 10,219,421 B2 | 3/2019 | Achen et al. | |
| 10,398,096 B2 | 9/2019 | Hassanzadeh et al. | |
| 10,408,645 B2 | 9/2019 | Blank et al. | |
| 10,448,555 B2 | 10/2019 | Foster et al. | |
| 10,800,423 B2* | 10/2020 | Schleicher | B60W 40/00 |
| 10,962,982 B2* | 3/2021 | Fridman | G06T 7/12 |
| 10,981,573 B2 | 4/2021 | Herrera | |
| 10,988,142 B1 | 4/2021 | Mehrotra et al. | |
| 11,029,681 B2* | 6/2021 | Rulseh | G05D 1/0011 |
| 2003/0055549 A1* | 3/2003 | Barta | B60W 10/20 701/1 |
| 2008/0269988 A1* | 10/2008 | Feller | G05D 1/027 701/41 |
| 2011/0077028 A1* | 3/2011 | Wilkes, III | B60W 30/08 455/456.3 |
| 2013/0032363 A1 | 2/2013 | Curry et al. | |
| 2015/0088381 A1 | 3/2015 | Imamura et al. | |
| 2015/0088802 A1* | 3/2015 | Jeon | B60K 28/00 706/52 |
| 2015/0237795 A1 | 8/2015 | Koch et al. | |
| 2016/0029547 A1 | 2/2016 | Casper et al. | |
| 2016/0031444 A1 | 2/2016 | Fairgrieve et al. | |
| 2016/0334798 A1 | 11/2016 | Foster et al. | |
| 2017/0309093 A1* | 10/2017 | Feng | B60W 10/10 |
| 2017/0363430 A1* | 12/2017 | Al-Dahle | G01C 21/3815 |
| 2018/0220577 A1 | 8/2018 | Posselius et al. | |
| 2019/0031231 A1 | 1/2019 | George | |
| 2019/0047573 A1* | 2/2019 | Herrera | B60W 40/109 |
| 2019/0079539 A1* | 3/2019 | Sridhar | B60W 40/06 |
| 2019/0129435 A1 | 5/2019 | Madsen et al. | |
| 2019/0183036 A1 | 6/2019 | Leimkuehler et al. | |
| 2019/0256102 A1* | 8/2019 | Schleicher | E02F 9/2045 |
| 2019/0387658 A1 | 12/2019 | Henry | |
| 2020/0005474 A1* | 1/2020 | Ferrari | G06V 10/46 |
| 2020/0029489 A1* | 1/2020 | Bertucci | A01B 69/008 |
| 2020/0037491 A1 | 2/2020 | Schoeny et al. | |
| 2020/0063401 A1 | 2/2020 | Sherlock | |
| 2020/0079381 A1 | 3/2020 | Lombrozo et al. | |
| 2020/0270824 A1 | 8/2020 | Nagayama et al. | |
| 2020/0285228 A1* | 9/2020 | Rulseh | G05D 1/0027 |
| 2020/0317018 A1* | 10/2020 | Nong | B60G 17/01908 |
| 2020/0393566 A1* | 12/2020 | Zeng | G01S 7/4808 |
| 2021/0048290 A1 | 2/2021 | Henry | |
| 2021/0055740 A1* | 2/2021 | Sridhar | G05D 1/0278 |
| 2021/0188284 A1 | 6/2021 | Hassel et al. | |
| 2021/0261157 A1* | 8/2021 | Pazhayampallil | B60W 40/068 |
| 2021/0274700 A1 | 9/2021 | Birkland et al. | |
| 2021/0276565 A1 | 9/2021 | Birkland et al. | |
| 2021/0282310 A1 | 9/2021 | Birkland et al. | |
| 2021/0283973 A1 | 9/2021 | Birkland et al. | |
| 2021/0284171 A1 | 9/2021 | Birkland et al. | |
| 2021/0284172 A1 | 9/2021 | Birkland et al. | |

FOREIGN PATENT DOCUMENTS

| | | | | |
|---|---|---|---|---|
| CN | 203259455 U | 10/2013 | | |
| CN | 112519785 A | 3/2021 | | |
| CN | 114787014 A | 7/2022 | | |
| DE | 19537257 A1 | 4/1996 | | |
| DE | 19844090 A1 | 4/1999 | | |
| DE | 10107862 A1 | 9/2002 | | |
| DE | 102019134495 A1 * | 7/2020 | | B60W 40/06 |
| EP | 1203928 A1 | 5/2002 | | |
| EP | 2218621 A1 | 8/2010 | | |
| EP | 3088845 A1 * | 11/2016 | | G01C 21/30 |
| EP | 3357316 A1 | 8/2018 | | |
| EP | 3527057 A1 | 8/2019 | | |
| EP | 3534113 A1 * | 9/2019 | | B60W 40/06 |
| EP | 3878255 A1 | 9/2021 | | |
| EP | 3878256 A1 | 9/2021 | | |
| EP | 3878257 A1 | 9/2021 | | |
| EP | 3878258 A1 | 9/2021 | | |
| JP | H1062311 A | 3/1998 | | |
| JP | H11189063 A | 7/1999 | | |
| JP | 2000131043 A | 5/2000 | | |
| JP | 2021165055 A | 10/2021 | | |
| WO | WO-2007129173 A2 * | 11/2007 | | B60W 30/188 |
| WO | WO2014027111 A1 | 2/2014 | | |
| WO | WO2014189059 A1 | 11/2014 | | |
| WO | WO2019142868 A1 | 7/2019 | | |
| WO | WO2020116352 A1 | 6/2020 | | |
| WO | WO-2021168452 A2 * | 8/2021 | | B60W 10/18 |

OTHER PUBLICATIONS

Extended European Search Report and Written Opinion issued in European Patent Application No. 21157583.2, dated Jul. 22, 2021, in 08 pages.

Ciampitti, Ignacio, and Lucas Haag. "Planter Downforce Technology for Uniform Seeding Depth." Kansas State University Agricultural Experiment Station and Cooperative Extension Service. Mar. 2017. Retrieved Jul. 6, 2020. Retrieved from the Internet: < https://bookstore.ksre.ksu.edu/pubs/MF3331.pdf>.

USPTO Non-Final Office Action issued in Utility U.S. Appl. No. 16/946,633 dated Jun. 30, 2022.

(56) References Cited

OTHER PUBLICATIONS

USPTO Non-Final Office Action issued in Utility U.S. Appl. No. 16/946,629 dated May 19, 2022.
Badua et al., Influence of Planter Downforce Setting and Ground Speed on Seeding Depth and Plant Spacing Uniformity of Corn, 14th International Conference on Precision Agriculture, Jun. 24-Jun. 27, 2018, pp. 1-13, Montreal, Quebec, Canada.

* cited by examiner

S207
ESTIMATE ZONES WITH CORRESPONDING SURFACE ROUGHNESS INDEX RANGES WITHIN A FIELD OR WORKSITE BASED ON THE DETERMINED SURFACE ROUGHNESS INDEX AS A VEHICLE TRAVERSES THE FIELD OR WORKSITE OVER MULTIPLE SAMPLING INTERVALS.

S210
DETERMINE A POSITION OF A VEHICLE OR ITS IMPLEMENT (E.G., GROUND-ENGAGING IMPLEMENT) IN THE WORKSITE OR FIELD, WITH RESPECT TO THE ESTIMATED ZONES.

S211
COLLECT IMAGE DATA OF THE FIELD OR WORKSITE IN A FORWARD FIELD OF VIEW OF THE VEHICLE.

S213
ESTIMATE A VISUAL SURFACE ROUGHNESS INDEX FOR THE COLLECTED IMAGE DATA WITHIN THE FIELD OF VIEW TO ESTABLISH TRANSITION REGION BETWEEN DIFFERENT ESTIMATED GROUND SPEED SETTING ZONES.

S216
PRIOR TO REACHING A NEXT TRANSITION REGION (E.G., DURING A LOOK-AHEAD PREPARATION PERIOD), ESTIMATE A NEXT GROUND SPEED SETTING FOR THE IMPLEMENT AND/OR VEHICLE CONSISTENT WITH ALIGNMENT/OVERLAP OF THE DETERMINED POSITION, THE ESTIMATED ZONES, AND THE ESTABLISHED TRANSITION REGION.

S218
AT THE ENTRANCE POINT OR BEGINNING OF THE NEXT TRANSITION REGION, CONTROL AN ACTUATOR AND/OR PROPULSION SYSTEM TO DECREASE OR DECREMENT THE NEXT GROUND SPEED SETTING FOR A SECONDARY CORRESPONDING ZONE WITH A SURFACE ROUGHNESS INDEX RANGE THAT IS GREATER THAN A LIMIT OF A PREVIOUS ZONE THRESHOLD, OR TO INCREASE OR INCREMENT THE GROUND SPEED SETTING FOR PRIMARY CORRESPONDING ZONE THAT IS LESS THAN A LIMIT OF THE PREVIOUS ZONE THRESHOLD TO TRANSITION BETWEEN DIFFERENT GROUND SPEED SETTINGS.

FIG. 2E

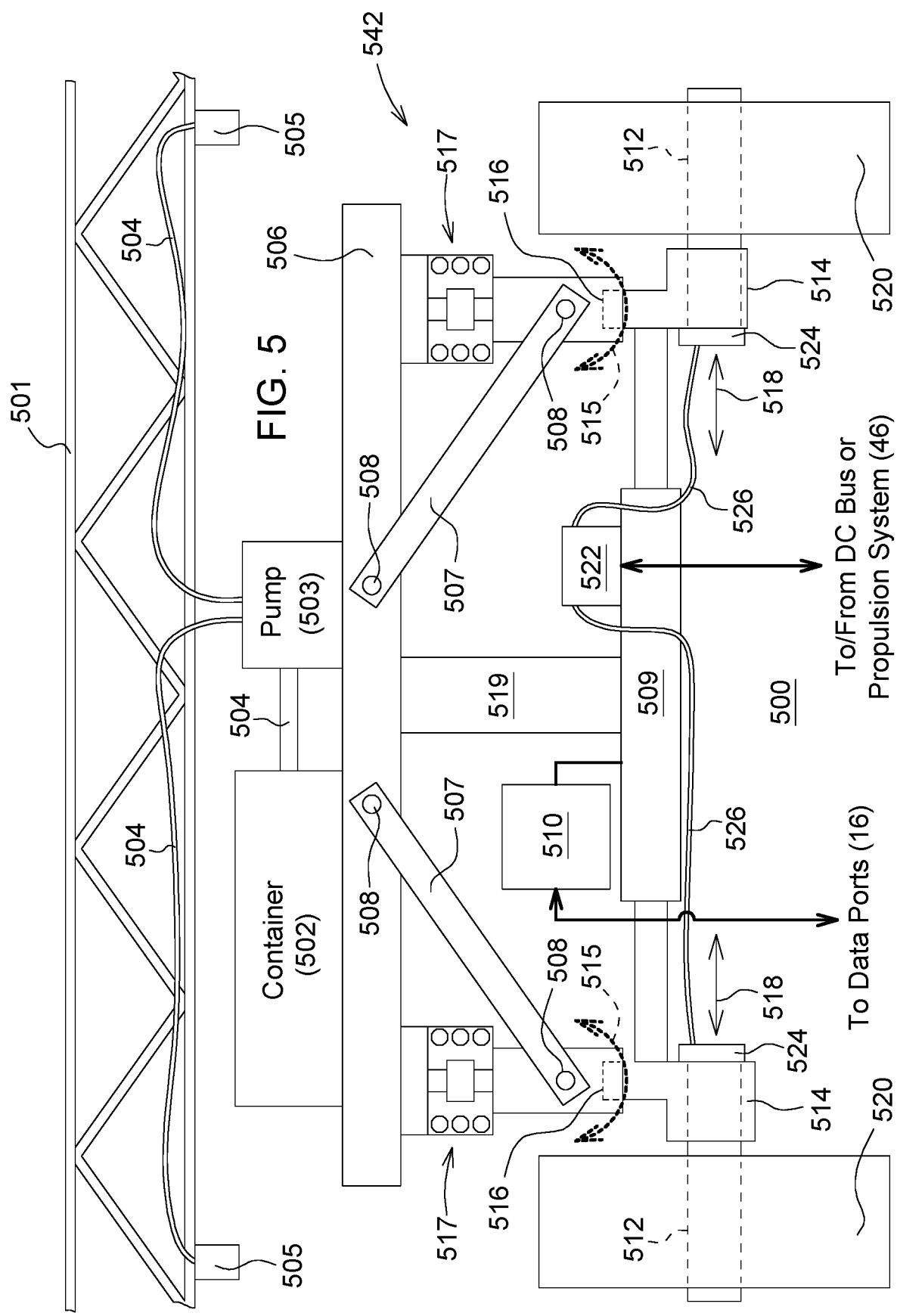

METHOD AND SYSTEM FOR ESTIMATING SURFACE ROUGHNESS OF GROUND FOR AN OFF-ROAD VEHICLE TO CONTROL GROUND SPEED

RELATED APPLICATION

This document (including the drawings) claims priority and the benefit of the filing date based on U.S. provisional application No. 62/989,240, filed Mar. 13, 2020, under 35 U.S.C. § 119 (e), where the provisional application is hereby incorporated by reference herein.

FIELD

This disclosure relates to a method and system for estimating surface roughness of ground for an off-road vehicle to control to control ground speed.

BACKGROUND

An off-road vehicle may be operated in fields or work sites where natural or artificial irregularities in the surface of the ground can impact the performance of the off-road vehicle, or its implement. For example, if a field has been subjected to earth-moving operations or deep tillage, surface irregularities, like ruts, may cause the vehicle's tires or tracks to deviate from the target path plan. Further, irregularities may contribute to operator fatigue or annoyance because of increased vibrations in the cab of the vehicle. In some cases, crop residue, surface soil, vegetation, or poor visibility (e.g., fog), can conceal surface irregularities to the operator or optical sensors of the vehicle.

In some background art, an automatic guidance system may be used to guide a vehicle, or its implement to track a path plan. However, certain ground or soil conditions can lead to variance of the off-road vehicle, or its implement, from tracking the target path plan, regardless of whether the automatic guidance system is fully operational. For example, in response to ground surface irregularities, the vehicle and implement may experience unwanted deviations in heading or yaw that tend to increase required application of crop inputs, such as seeds, fertilizer, nutrients, fungicides, pesticides, herbicides, or other treatments to cover fully a filed or work area. The application of crop inputs could vary from target settings, specifications or target tolerances. Thus, there is a need a method and system for estimating surface roughness of ground for an off-road vehicle to control ground speed of the vehicle.

SUMMARY

In accordance with one embodiment, a method and system is configured to estimate surface roughness of ground for an off-road vehicle to control ground speed. Motion data is detected for an off-road vehicle traversing a field or work site during a sampling interval. The motion data may comprise ground speed (e.g., ground velocity) of the off-road vehicle. A location-determining receiver provides a respective position of the vehicle, or its implement, for the sampling interval. A first sensor is adapted to detect pitch data of the off-road vehicle for the sampling interval (e.g., to obtain pitch acceleration). A second sensor is adapted to detect roll data of the off-road vehicle for the same sampling interval (e.g., to obtain roll acceleration). An electronic data processor or surface roughness index estimator module determines or estimates a surface roughness index for a cell or zone of the field or work area based on the detected motion data, pitch data and roll data for the sampling interval. The surface roughness index can be displayed by respective position (e.g., two or three dimensional coordinates) on the graphical display to a user or operator of the vehicle, or stored, regularly, in a data storage device to create a data map of surface roughness index versus respective positions (e.g., traversed by the vehicle) in the field or work site.

In accordance with another aspect of the disclosure, the electronic data processor or surface roughness index estimator module is configured to estimate zones (e.g., cells) with corresponding surface roughness index ranges within a field or work site based on the determined surface roughness index as a vehicle traverses or traversed the field or work site over multiple sampling intervals. Further, the electronic data processor or surface roughness index estimator module can generate a graphical display that illustrates the estimated zones of corresponding surface roughness or index ranges within the field or work site. In accordance with yet another aspect of the disclosure, the electronic data processor or a ground speed module can apply or enforce ground speed settings of the vehicle, or its implement.

BRIEF DESCRIPTION OF THE DRAWINGS

FIG. 2E is a flow chart of a fifth embodiment of a method for estimating surface roughness of ground for an off-road vehicle to control ground speed of the off-road vehicle, its implement, or both.

FIG. 5 is rear view of a towable sprayer implement with steerable wheels, where the implement can be towed by an off-road vehicle via a hitch.

DETAILED DESCRIPTION

Figure 1A:
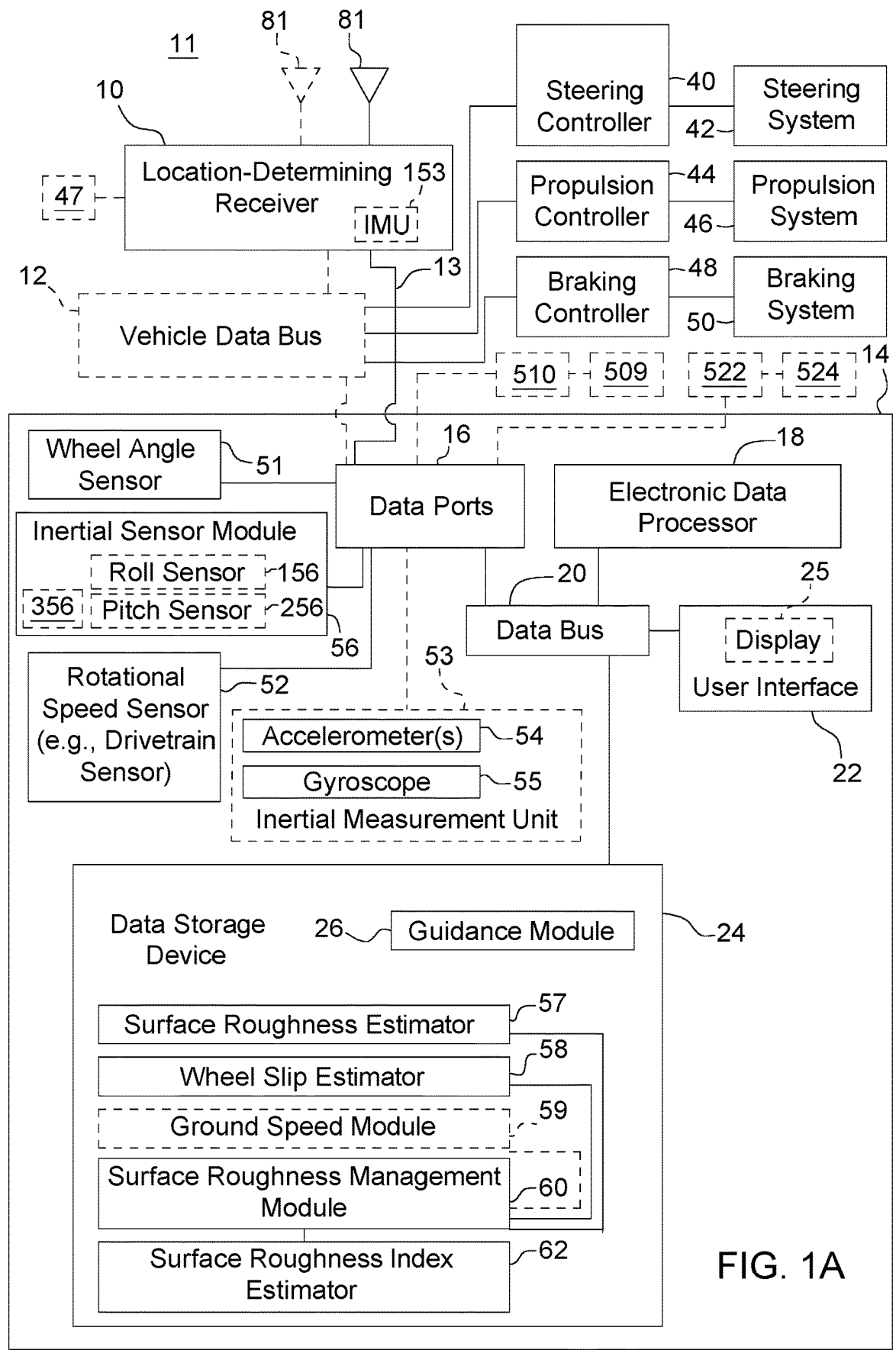
FIG. 1A is a block diagram of one embodiment of a system for estimating surface roughness of ground for an off-road vehicle to control ground speed of the off-road vehicle, its implement, or both.

FIG. 1A is one embodiment of a block diagram of a system 11 for estimating surface roughness of ground (e.g., one or more zones or cells of the ground) for an off-road vehicle (e.g., 82 in FIG. 4) to control ground speed of: (a) the off-road vehicle, or (b) any steerable implement coupled to the off-road vehicle, or (c) both the off-road vehicle and the steerable implement coupled to the off-road vehicle. In FIG. 1A, the system 11 is capable of detecting motion data and attitude data by one or more sensors, such as one or more location-determining receivers (10, 110), an inertial sensor module 56, one or more accelerometers, 54, a gyroscope 55, or an internal measurement unit (IMU) (53, 153) that use accelerometers or gyroscopes. In one example, the system 11 may send a surface roughness indicator (e.g., surface roughness index value) or data message to an operator or end user of the detection system 11 via a user interface 22 that is incorporated into a vehicle, such as a display 25. In an alternate embodiment, the user interface 22 and display 25 may be located remotely from the vehicle via a wireless link to support remote control or tele-operation of the vehicle by the operator.

In one embodiment, the system 11 comprises an electronic data processing system 14 that is coupled to a location-determining receiver 10 directly, or via a vehicle data bus 12. The optional connection via vehicle data bus 12 is shown in dashed lines because it is optional and the connection between the electronic data processing system 14 and location-determining receiver 10 may be direct, as indicated by transmission line 13, which can be used separately or cumulatively with the interconnection via the vehicle data bus 12. The location-determining receiver 10 may have an antenna 81 mounted on the vehicle, on the implement or both.

In an alternate embodiment, a first location-determining receiver 10 and its antenna 81 are on or in the vehicle (e.g., 82 in FIG. 4); a second location-determining receiver 110 (in FIG. 1B) and its antenna are on or in the implement (e.g., 83 in FIG. 4), where both the first location-determining receiver 10 and the second-location determining receiver 110 may comprise satellite navigation receivers (with or without differential correction data) or other location-determining receivers.

In one embodiment, the electronic data processing system 14 comprises an electronic data processor 18, one or more data ports 16, a user interface 22 and a data storage device 24 coupled to a data bus 20. The electronic data processor 18 may comprise a processor, a microcontroller, a digital signal processor, an application specific integrated circuit (ASIC), a programmable logic array, a programmable logic device, a logic circuit, an arithmetic logic unit, a Boolean logic device, or another data processing device. The data storage device 24 may comprise one or more of the following: electronic memory, nonvolatile electronic memory, an optical data storage device, a magnetic data storage device, or other device for storing digital or analog data.

In one embodiment, the data storage device 24 may store, retrieve, read and write one or more of the following items: a guidance module 26, a surface roughness estimator 57, a wheel slip estimator 58, a ground speed module 59 (e.g., ground speed estimator), a surface roughness management module 60, and a surface roughness index estimator 62. A module means software, electronics, or both, where software can include software instructions, executable files, data structures, and libraries, among other things.

As used in this document, configured to, adapted to and arranged to may refer any of the following items: (1) software or program instructions that are stored in the data storage device 24 or other data storage and executable by the data processor 18 to perform certain functions, software, (2) software or embedded firmware that are stored in the location-determining receiver (10, 110) or its memory or data storage to perform certain functions, or (3) electronic, electrical circuits or modules that can perform substantially equivalent functions to the software, embedded firmware or program instructions.

Any data port 16 may comprise a data transceiver, buffer memory, or both. The user interface 22 may comprise one or more of the following: a display 25 (e.g., display), a touch screen display, a keypad, a keyboard, a control panel, a pointing device (e.g., electronic mouse), or another device for entry or output of data from the data processing system 14.

In one embodiment, a wheel angle sensor 51, one or more accelerometers 54, an inertial sensor module 56, a rotational speed sensor 52, an optional IMU (53, 153) and a data bus 20 are coupled to the data ports 16. The electronic data processing system 14 communicates to data ports 16 directly, or indirectly via the data bus 20. Further, the data ports 16 support the communication of data messages to, from or between, or among any of the following: the electronic data processor 18, the data storage device 24, any modules, data, files, libraries, or software within the data storage device 24, the location-determining receiver (10, 110) the wheel angle sensor 51, the inertial sensor module 56, one or more accelerometers 54, a rotational speed sensor 52, an optional IMU and a data bus 20.

In one embodiment, the optional IMU 53 is a separate device, whereas in other embodiments, the IMU 153 is integral with the location-determining receiver 10. The optional separate IMU 53 comprises one or more accelerometers 54 and a gyroscope 55, where the accelerometers 54 may be arranged on orthogonal axes with respect to each other to facilitate detection of vehicle attitude, such as roll angle, pitch angle and yaw angle of a vehicle.

In FIG. 1A, the steering controller 40, the propulsion controller 44 and the braking controller 48 are coupled to the vehicle data bus 12. For example, the data processing system 14 can communicate with the steering controller 40, the propulsion controller 44 and the braking controller 48, and vice versa. In one embodiment, the steering controller 40 is coupled to the vehicle steering system 42, such as an actuator, an electrical motor or electrohydraulic device that is mechanically coupled to a steering mechanism (e.g., rack-and-pinion or Ackerman steering system) for controlling the angular orientation of one or more wheels about a generally vertical axis.

The propulsion controller 44 may operate with, or consistent with, a ground speed setting of the vehicle, its implement, or both that is provided by the electronic data processor 18 or the ground speed module 59. Subject to supervision or superseding control of electronic data processor 18 or the ground speed module 59, the propulsion controller 44, alone or together with the propulsion system 46 of the vehicle, may control ground speed of the vehicle, its implement or both; ground speed commands or ground-speed-related data that can be expressed or represented as any of the following: (a) commanded ground speed or target ground speed; (b) ground speed limit or maximum speed, (c) target rotational speed of engine shaft, drive electric motor, or driveline (e.g., expressed in revolutions per unit time) of propulsion system 46, (d) target commanded or target torque of engine shaft, drive electric motor or driveline of propulsion system 46, (e) target rotational acceleration of engine shaft, drive electric motor or driveline, and (f) braking commands of a drive electric motor or driveline of the propulsion system 46 operating in a braking mode or power regeneration mode to decelerate the vehicle and/or its implement.

In one embodiment, the propulsion controller 44 may comprise an electronic engine controller for controlling a throttle or fuel metering system of a propulsion system 46, such as internal combustion engine. In another embodiment, a propulsion controller 44 may comprise an inverter or motor controller for controlling a propulsion system 46, such as a drive motor or actuator (e.g., propulsion actuator) of a hybrid or electric vehicle. In one embodiment, the braking controller 48 interfaces with a braking system 50, such as hydraulic braking system, an electrohydraulic braking system, a cable braking system, or an electromechanical braking system to stop or decelerate the vehicle.

In one embodiment, the implement (e.g., 500 in FIG. 5) may comprise an auxiliary electric drive system, which has motor controller 522 (e.g., bi-directional inverter or bi-directional, dual inverter) electrically coupled to one or more electric drive motors 524 or actuators (e.g., implement actuators), such as hub motors or motors that are mechanically coupled to drive wheels 520 (e.g., for mutual rotation) or tracks of the implement. The auxiliary electric drive system may be powered (e.g., via a direct current (DC) bus) by an energy source on the vehicle, or the implement. For instance, the energy source may comprise a battery, a capacitor bank, another energy storage device, or an alternator or generator driven by (e.g., mechanical/rotational energy of) the propulsion system 46. Under the direction of the electronic data processor 18 or the ground speed module 59, the motor controller 522 may operate or control or more electric drive motors 524 in a motoring mode, a braking mode, or a power regenerative braking mode to achieve a target ground speed setting by propelling the implement in the motoring mode, or by slowing the ground speed of the implement in the braking mode or power regenerative mode.

The braking controller 48 may operate with, or consistent with, a ground speed setting of the vehicle, its implement, or both. With respect to the vehicle, the braking controller 48, alone or together with the baking system 50 or its braking actuators (e.g., electrohydraulic or electromechanical braking actuators), may control ground speed, ground speed commands, or ground-speed-related data that can be expressed or represented as any of the following: (a) commanded ground speed or target ground speed; (b) ground speed limit or maximum speed, (c) braking commands to activate the braking system 50 to reduce ground speed or maintain a ground speed (e.g., target ground speed, speed limit or maximum speed) of the vehicle, its implement or both, and (d) braking commands of a drive electric motor or driveline of the propulsion system 46 operating in a braking mode or power regeneration mode to decelerate the vehicle and/or its implement consistent with the target ground speed or ground speed setting.

As used throughout this document, actuator may refer to the standard dictionary meaning of actuator, consistent with the vehicle engineering terminology, and further comprise one or more of the following actuators: (1) a propulsion actuator of the propulsion system 46, such as an electric drive motor if the propulsion system 46 is configured as an electric or hybrid drive system, or an electromechanical actuator of a fuel metering system for an internal combustion engine to the extent the propulsion system 46 comprises an internal combustion engine; (2) a braking actuator of the braking system 50, such as an electrohydraulic or electromechanical actuator that controls disc, drum of other brake configurations of the braking system 50; (3) an implement actuator, such as one or more electric drive motors 524 (e.g., of the implement 500) for operating in a motoring mode, a braking mode, or a power regeneration mode during deceleration. As used throughout this document, a vehicle actuator is associated with, incorporated into, or on, a respective vehicle, whereas an implement actuator is associated with, incorporated into, or on, a respective implement. The propulsion actuator of the propulsion system 46 is typically associated with the vehicle. Similarly, the braking actuator of the braking system 50 is typically associated with the vehicle.

Figure 1B:
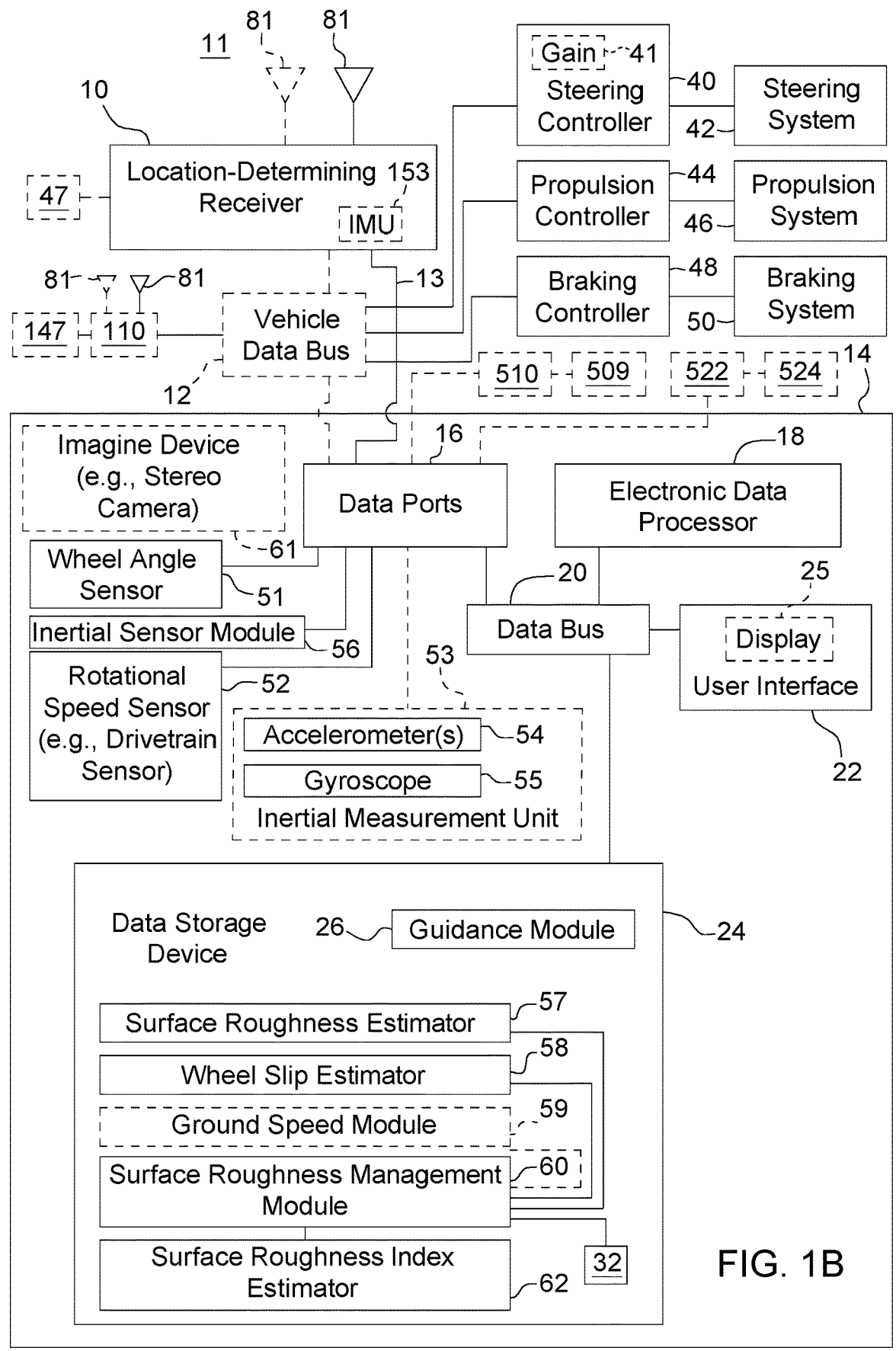
FIG. 1B is a block diagram of another embodiment of a system for estimating surface roughness of ground for an off-road vehicle to control ground speed of the off-road vehicle, its implement, or both.

In FIG. 1A and FIG. 1B, an optional implement steering controller 510 is coupled to the data port 16 or the data processing system 14. In turn, the optional implement steering controller 510 is electrically coupled to the optional implement steering actuator 509. The optional implement steering controller 510 and the optional implement steering actuator 509 are indicated in dashed lines because they are optional.

In one embodiment, the optional implement steering controller 510 is coupled to the implement steering actuator 509. The implement steering actuator 509 may comprise an actuator, an electrical motor or electrohydraulic device that is mechanically coupled to a steering mechanism (e.g., rack-and-pinion or Ackerman steering system) for controlling the angular orientation of one or more wheels of the implement about a generally vertical axis. The optional implement steering controller 510 may operate with a steering gain setting that controls a sensitivity or aggressiveness of implement steering commands, such as implement steering commands that can be expressed or represented as any of the following: (a) maximum angular displacement per unit time, (b) a maximum yaw angular velocity, (c) target range for yaw angular velocity, (d) a maximum yaw angular acceleration, and target range for yaw angular acceleration.

Further, the electronic data processor 18, the ground speed module 59, and/or the surface roughness management module 60 may determine, generate and send ground speed data (e.g., ground speed setting, a ground speed limit, or target ground speed) to the propulsion controller 44, the implement motor controller 522, or both to control the propulsion system 46, the implement electric drive motor 524, or both simultaneously. Accordingly, ground speed data for the vehicle propulsion controller 44 or the vehicle propulsion system 46 may be referred to as ground speed setting, a target ground speed, a ground speed limit, a maximum speed or more specifically a vehicle ground speed setting, vehicle target ground speed, a vehicle ground speed limit or a vehicle maximum ground speed. Similarly, ground speed data for the implement motor controller 522 or one or more implement electric drive motors 524 may be referred to as ground speed setting, a target ground speed, a ground speed limit, a maximum speed or more specifically an implement ground speed setting, an implement target ground speed, an implement ground speed limit or an implement maximum speed.

In general, the electronic data processor 18 or the ground speed module 59 may be configured to limit ground speed of the vehicle, its implement, or both, to a ground speed limit, target ground speed or another ground speed setting even if the operator or the automated guidance system (e.g., guidance module 26) requests or commands a greater ground speed (e.g., commanded ground speed). For example, the automated guidance system (e.g., guidance module 26) may operate the vehicle in an automated mode or in a semi-automated mode in which an operator supervises what would otherwise be an unmanned mode. In the automated mode, the guidance module 26, alone or together with the location determining receiver (10, 110) guides the vehicle to follow or track a path plan in a work area or field. In some examples, the path plan may include a series of way points that the vehicle will traverse, possibly along with a planned ground speed or planned velocity that is associated with one or more way points or segments (e.g., straight or curved segments) of the path plan. However, the electronic data processor 18 or the ground speed module 59 may override or supersede the planned ground speed or planned velocity that is associated with one or more way points or segments (e.g., straight or curved segments) of the path plan to achieve a ground speed setting, such as a ground speed limit or a maximum ground speed of the vehicle, its implement, or both, where the ground speed limit or maximum ground speed is inversely proportional to a surface roughness index associated with a respective zone that the vehicle, or its implement occupies or will occupy next give the present heading or vehicle yaw.

In one configuration, the guidance module 26 controls the vehicle to track or follow a path plan, consistent with a ground speed setting, ground speed limit, or target ground speed provided by the ground speed module 59. Further, a path plan may comprise a generally linear path plan, a curved path plan, a contour path plan, a spiral path plan, a coverage area path plan, or other path plan, such as any of the path plans illustrated in FIG. 3A or FIG. 3B. For example, a path plan may comprise any of the following: one or more linear path segments or rows 302, curved path segments or turns 303, such as an end turn, a key-hole end turn, a loop end turn, a row-skipping end turn. In the automated guidance mode, in certain vehicle configurations the guidance module 26 can control the steering, propulsion, and braking of the vehicle. For example, in the automated guidance mode, the guidance module 26 can communicate with one or more of the following controllers to direct and guide the vehicle: steering controller 40, propulsion controller 44 and braking controller 48.

In FIG. 1A in accordance with one embodiment, the system 11 comprises one or more location-determining receivers 10 for estimating a position, motion, and attitude data of the vehicle (82 in FIG. 4), or its implement (e.g., 83 in FIG. 4), or both. As used in the disclosure, attitude refers to roll angle, pitch angle and yaw angle, or motion data associated with roll angle, pitch angle and yaw angle. As used in the disclosure, motion data comprises velocity data (e.g., speed data), acceleration data, or both. The velocity data and acceleration data may be expressed as vectors. As used in the disclosure, a yaw angle or heading can refer to: (1) an angular direction of travel of the vehicle with reference to due North or magnetic North, or (2) a yaw or yaw angle of the vehicle with reference to coordinate system, such as a Cartesian coordinate system.

In an alternate embodiment, a first location-determining receiver 10 or its antenna 81 is mounted on the vehicle for estimating a position, motion and/or attitude data of the vehicle (82 in FIG. 4) and a second location-determining receiver 110 is mounted on the implement (e.g., 83 in FIG. 4) for estimating a position, motion and/or attitude data of the implement that is coupled to the vehicle; position, motion and attitude data is available for the vehicle, its implement or both for processing by the electronic data processor 18 to execute the software instructions associated with modules, estimators, or other components within the data storage device 24.

In one embodiment, the location-determining receiver (10, 110) (e.g., satellite navigation receiver), alone or together with a wireless communications device, has a pair of antennas 81 that are spaced apart with a known orientation. Further, the location-determining receiver (10, 110) or the electronic data processor 18 can couple (e.g., selectively or switchably in rapid succession during the same epoch) either antenna 81 of the pair of antennas 81 to support estimation of the attitude of the pair of antennas 81 when the vehicle or implement is at a fixed position or substantially the same position. For example, the pair of antennas 81 are spaced apart by a known distance on an axis with a known or fixed orientation (e.g., compound angular offset in one or more dimensions) to the longitudinal axis (in the direction of travel of the vehicle) and vertical axis of the vehicle. The location-determining receiver (10, 110) may estimate a first position (e.g., in three dimensions) of the first antenna 81 and a second position (e.g., in three dimensions) of the second antenna 81. Accordingly, the data processor or the location-determining receiver (10, 110) may estimate the precise attitude (e.g., yaw data, roll data, or both) of the vehicle, or its implement, based on the first position and the second position for the same epoch or measurement period, with or without augmentation by the correction data.

In one embodiment, as illustrated in FIG. 1B, a wireless communications device (47, 147) is coupled to a data port of a location-determining receiver (10, 110) or a vehicle data bus 12 to augment the received satellite signals and associated carrier phase measurements of the received satellite signals (e.g., of at least four satellites) at the location-determining receiver (10, 110). For example, the wireless communications device (47, 147) may comprise a separate receiver or transceiver (e.g., satellite, cellular, or wireless device) may receive the correction data or differential correction data via a wireless signal transmitted from a satellite or a terrestrial base station (e.g., real-time kinematic (RTK) base station). The wireless communications device (47, 147) may receive correction data from one or more of the following sources of correction data: (a) differential correction data from local base stations or local reference receivers operating in a real-time-kinematic (RTK) mode, (b) correction data associated with a precise-point-position (PPP) satellite navigation system with precise orbital correction data for satellites and satellite clocks in a PPP mode, (c) correction data applicable to a satellite navigation system, and correction data (e.g., carrier-phase offset or position vector offset) provided from a hub or central processing center in communication a network of reference satellite navigation receivers, and (d) other correction data is commercially available from local, wide-area, regional, or global correction or satellite data augmentation services.

In one embodiment, the location-determining receiver (10, 110) provides one or more of the following types of data for a vehicle, and/or its implement: yaw data (e.g., heading data), roll data, pitch data, position data, velocity data, and acceleration data (e.g., as vectors or in two or three dimensional coordinates). The location-determining receiver (10, 110) may comprise a satellite navigation receiver, a Global Navigation Satellite System (GNSS) receiver, a Global Positioning System (GPS) receiver, or another receiver for determining position data, motion data or attitude data. In one embodiment, a location-determining receiver (10, 110) provides location data, path heading data, vehicle heading data, velocity data, and acceleration data along target path or path plan to the data processing system 14 or guidance module 26.

In one embodiment, an optional separate inertial measurement unit 53 (IMU) may be separate from the location-determining receiver 10 or an optional integral IMU 153 may be integrated with the location determining receiver 10. The optional nature of the separate IMU 53 and the integral IMU 153 is indicated by dashed lines in FIG. 1A. The separate IMU 53 or the integral IMU 153 can estimate the attitude, yaw angle, yaw rate, roll, roll rate, pitch angle, pitch rate for the vehicle, or its implement, for instance. The yaw rate may refer to yaw angular velocity, yaw angular acceleration or both; the roll rate may refer to roll angular velocity, roll angular acceleration or both; the pitch rate may refer to pitch angular velocity, pitch angular acceleration or both.

In one configuration, the data processing system 14 comprises an inertial sensor module 56, which may further comprise a roll sensor 156, a pitch sensor 256 and an optional yaw sensor 356. The roll sensor 156, the pitch sensor 256 and the optional yaw sensor 356 are shown in dashed lines to indicate that the sensors are optional. The inertial sensor module 56 may comprise any of the following: a roll sensor, pitch sensor, yaw sensor, one or more accelerometers, a three-axis accelerometer, a gyroscope, an IMU, or another sensor. In general, each sensor, such as roll sensor 156, that is based on accelerometric, gyroscopic, or inertial measurements is subject to bias in their measurements that may arise over time, unless the sensor is calibrated or recalibrated (e.g., by the carrier phase measurements of the location-determining receiver (10, 110)).

In one embodiment, the roll sensor 156 comprises a first accelerometer that is configured to measure roll angle, roll angular velocity, and/or roll angular acceleration of the vehicle. Similarly, the pitch sensor 256 comprises a second accelerometer that is configured to measure pitch angle, pitch angular velocity and/or pitch angular acceleration of the vehicle. In one configuration, the roll sensor 156 and the pitch sensor 256 may provide attitude data and motion data, such as roll data and pitch data, that the electronic data processor 18 can use to determine a surface roughness estimate.

In another embodiment, the inertial sensor module 56, the accelerometers 54, gyroscopes 55 or IMU (53, 153) of the data processing system 14 detect or measure one or more of the following: pitch angle, pitch motion data, roll angle and roll motion data to support the estimation of a surface roughness index for a cell or zone of the field or work area based on the detected motion data, pitch data and roll data for the sampling interval. To determine a reliable or accurate estimate of the surface roughness index, the electronic data processor 18 can estimate the sensor bias to perform calibration of roll sensor data, pitch sensor data, or both.

In one embodiment, a motion sensor, such as a location-determining receiver (10,110), odometer, speedometer, or a radar device, is configured to detect motion data of an off-road vehicle traversing a field or work site during a sampling interval. The motion data comprises ground speed or velocity of the off-road vehicle, or its implement. A roll sensor 156 (e.g., accelerometer, inertial sensor, or IMU (53, 153)) is configured to: (a) detect roll data of the off-road vehicle, or its implement, for the sampling interval to obtain a roll acceleration, or (b) detect roll angular acceleration data for the sampling interval. A pitch sensor 256 (e.g., accelerometer, inertial sensor, or IMU (53, 153)) is configured to: (a) detect pitch data of the off-road vehicle, or its implement, for the sampling interval to obtain a pitch acceleration, or (b) detect roll angular acceleration data of the off-road vehicle, or its implement, for the sampling interval. If the first sensor or pitch sensor only detects pitch angle with respect to time, the electronic data processor 18 is configured to derive the pitch angle acceleration from a derivative of the detected pitch angle with respect to time. Similarly, if the second sensor or roll angle sensor only detects roll angle with respect to time, an electronic data processor 18 is configured to derive the roll angle acceleration from a derivative of the detected roll angle with respect to time.

In an alternate embodiment, the surface roughness estimator 57 can operate in accordance with various techniques that may be applied alternately or cumulatively. Under a first technique, the surface roughness estimator 57 determines estimated surface roughness index based on a measure of roll angle rate variability. Under a second technique, the surface roughness estimator 57 determines estimated surface roughness value or surface roughness index based on a standard deviation of the rate of roll angle change with respect to time.

In one embodiment, a rotational speed sensor 52 is configured to measure a drivetrain-derived wheel speed. A wheel-slip estimator 58 estimates the wheel slip indicator based on drivetrain-derived wheel speed and the estimated velocity, which is provided by the location-determining receiver 10. A wheel-slip estimator 58 estimates the wheel slip indicator based on numerator of drivetrain-derived wheel speed (e.g., sensor wheel speed) minus estimated velocity, which numerator is collectively divided by the drivetrain-derived wheel speed.

In FIG. 1A, a surface roughness estimator 57 is configured to estimate cells or zones with corresponding surface roughness index ranges within a field or work site based on the determined surface roughness index as a vehicle (e.g., 82 in FIG. 4) traverses or traversed the field or work site over multiple sampling intervals. An electronic data processor 18 is configured to generate a graphical display 25 that illustrates the estimated cells or zones of corresponding surface roughness or index ranges within the field or work site. Further, an end user interface 22 is adapted to display 25 the graphical display 25 to a user or operator of the vehicle. In some configurations, the graphical display that illustrates estimates cells or zones of corresponding surface roughness index ranges may resemble FIG. 3A or FIG. 3B, although graphical representations fall within the scope of the disclosure and appended claims.

A location-determining receiver (10, 110) can determine a position of a vehicle (82), or its implement (83, 500), in the field or in the work site with respect to the estimated zones of different corresponding surface roughness index ranges.

In one embodiment, the ground speed module 59 can be operated in accordance with various technique, which may be applied separately or cumulatively. Under a first technique, a ground speed module 59 is configured to estimate a ground speed setting (e.g., target ground speed setting) for the vehicle consistent with alignment and/or overlap of the determined position (e.g., in two or three dimensional coordinates) of the vehicle and the estimated zones. Under a second technique, a ground speed module 59 is configured to estimate ground speed settings (e.g., target ground speed settings) associated with the corresponding implement consistent with alignment and/or overlap of the determined position of the implement and the estimated zones.

Figure 3A:
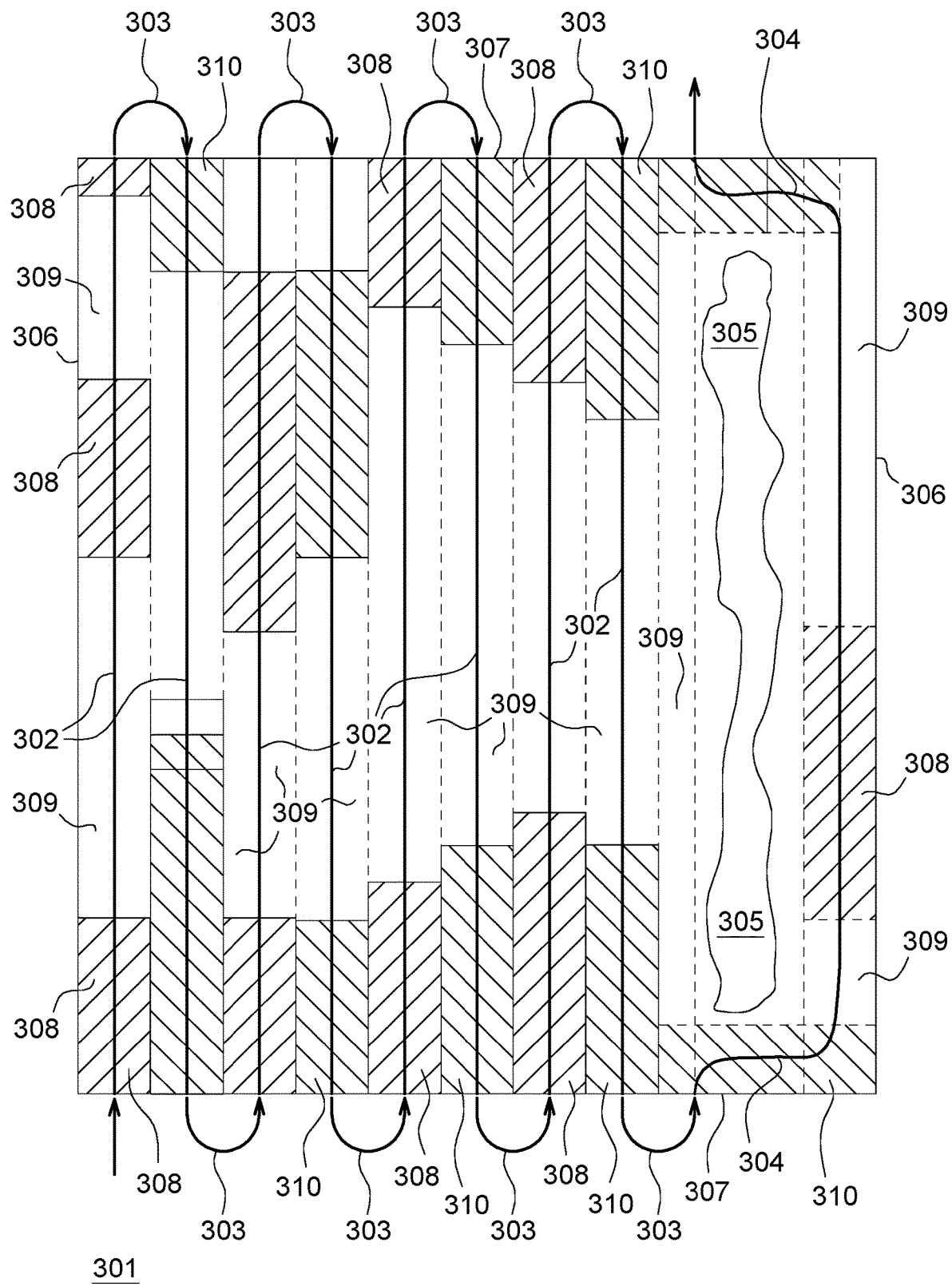
FIG. 3A is a plan view of a first illustrative map of surface roughness zones within a hypothetical field.
Figure 3B:
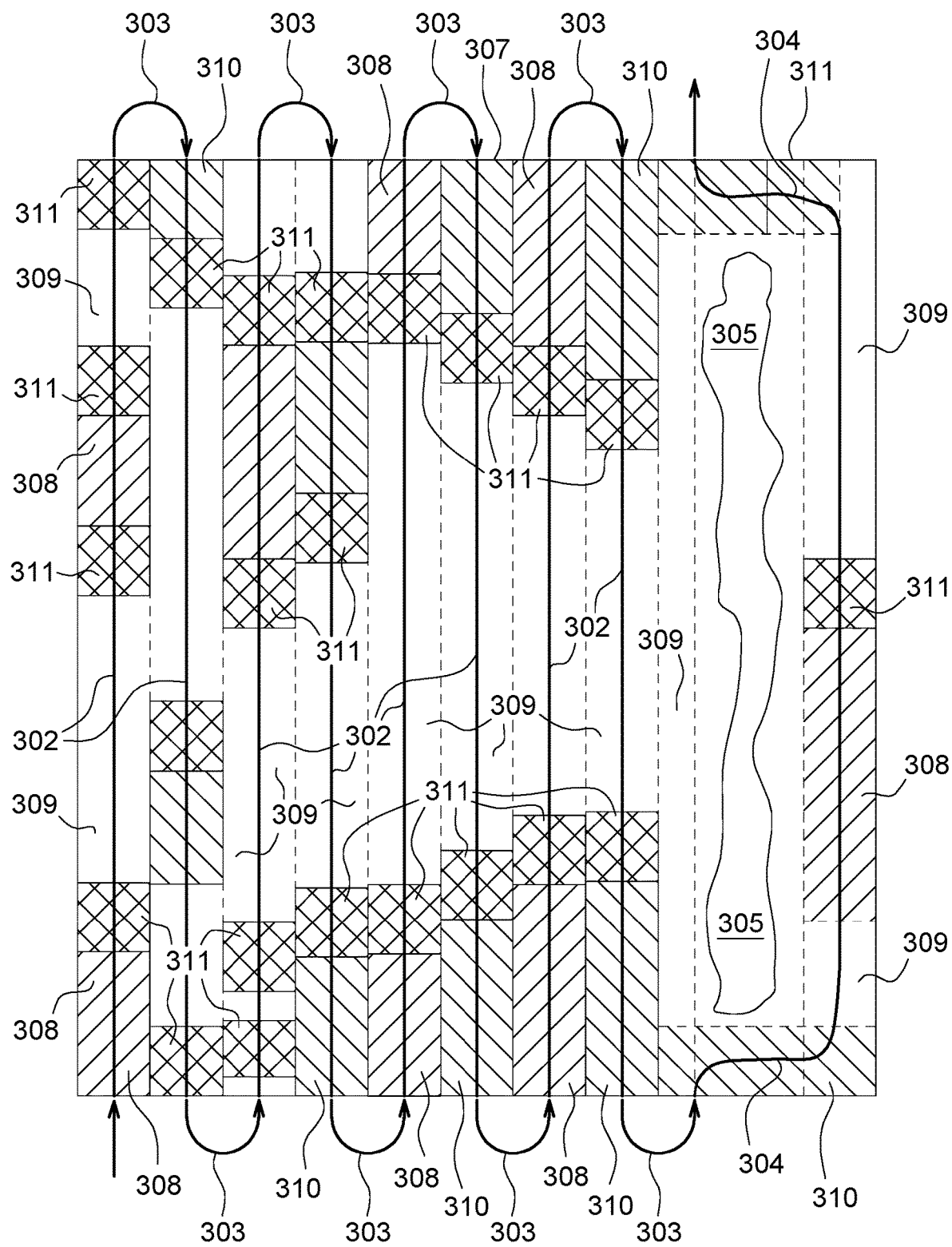
FIG. 3B is a plan view of a second illustrative map of surface roughness zones within a hypothetical field.

As illustrated in FIG. 1A in conjunction with FIG. 3A or FIG. 3B, the electronic data processor 18, the ground speed module 59, and the surface roughness management module 60 can be operated in accordance with various procedures that may be applied separately or cumulatively. Under a first procedure, the electronic data processor 18, the ground speed module 59, and the surface roughness management module 60 are configured to control an actuator (e.g., electric drive motor 524) and/or propulsion system 46 (e.g., via a propulsion controller 44) to adjust (e.g., increase, increment, decrease, decrement) the estimated ground speed setting (e.g., ground speed limit, maximum ground speed, or ground speed target, or ground speed target range) for corresponding zones with a surface roughness index ranges for transitions or changes between different zone limits or zone thresholds. For example, the electronic data processor 18, the ground speed module 59, and/or the surface roughness management module 60 are configured to control an electric drive motor 524 (e.g. via a motor controller 522) in a motoring mode, a braking mode, or power regeneration mode, or any combination of the above modes, to adjust the estimated ground speed setting for corresponding zones with a surface roughness index ranges for transitions or changes between different zone limits or zone threshold. Similarly, if the propulsion system 46 comprises an actuator or electric drive motor (e.g., in an electric or hybrid vehicle configuration), the electronic data processor 18, the ground speed module 59 and/or the surface roughness management module 60 are configured to control an electric drive motor 524 (e.g. via the propulsion controller 44) in a motoring mode, a braking mode, or power regeneration mode, or any combination of the above modes, to adjust the estimated ground speed setting for corresponding zones with a surface roughness index ranges for transitions or changes between different zone limits or zone threshold.

Under a second procedure, the electronic data processor 18, the ground speed module 59, and the surface roughness management module 60 are configured to control an actuator (e.g., electric drive motor 524) and/or propulsion system 46 (e.g., via a propulsion controller 44) to increase or increment the present ground speed setting for a corresponding primary zone (present zone) with a respective present surface roughness index range; where the increase or increment is with respect to a previous ground speed for a corresponding previous zone with a respective greater surface roughness index range than the primary surface index range; and where greater surface roughness means an upper limit of the present zone is lower than or equal to a lower limit of the previous zone.

Under a third procedure, the electronic data processor 18, the ground speed module 59, and the surface roughness management module 60 are configured to control an actuator (e.g., electric drive motor 524) and/or propulsion system 46 (e.g., via a propulsion controller 44) to decrease or decrement the present ground speed setting for a corresponding secondary zone (present zone) with a respective present surface roughness index range; where the decrease or decrement is with respect to a previous ground speed for a corresponding previous zone with a respective lesser surface roughness index range than the secondary surface index range; and where lesser surface roughness means an lower limit of the secondary zone (present zone) is greater than or equal to an upper limit of the previous zone.

The system 111 of FIG. 1B is similar to the system 11 of FIG. 1A, except the system 111 further comprises an imaging system 61, a visual surface roughness index estimator 32, a second location determining receiver 110, and a wireless communications device 147. As illustrated the imaging system 61 is coupled to one or more data ports 16 of the data processing system 14; the visual surface roughness index estimator 32 comprises a module or software instructions that are stored in the data storage device 24 for execution by the electronic data processor 18. Like reference numbers in FIG. 1A and FIG. 1B indicate like features or elements.

In one embodiment, the imaging system 61 is configured to collect image data of the field or work site in a forward field of view of the vehicle in one or more electromagnetic frequency bands or wavelengths, such as humanly visible light, infra-red radiation, ultra-violet radiation, or the like. For example, the imaging system 61 may comprise a stereo imaging system or stereo camera for collecting stereoscopic images or three-dimensional image clouds or three-dimensional image constellations of ground regions within the field of view (e.g., forward facing region or zone in front of the vehicle 82). In some configurations, the imaging system 61 or electronic data processor 18 can align (e.g., or stitch together) successive local images to assemble an aggregate view of an entire field or work area that is traversed or surveyed by the off-road vehicle equipped with the imaging system 61. For example, the imaging system 61 or electronic data processor 18 may assign or identify two or three dimensional reference points in successive local images to spatially align successive images to assemble an aggregate view of an entire field or work area.

Based on the collected three-dimensional image clouds or three-dimensional image constellations, the electronic data processor 18 or visual surface roughness index estimator 32 configured to estimate a visual surface roughness index for the collected image data within the field of view to establish a transition between different estimated ground speed setting zones. For example, the electronic data processor 18 and/or visual surface roughness estimator 32 may estimate or model the three-dimensional slope or compound slopes of zones or cells within the field of the work area, such as average, mean, mode or median cellular pitch angle, cellular roll angle and cellular yaw angle for each cell within a work area or field. In one configuration, the visual surface roughness index may be based on a visual estimation of the surface roughness index (p), determined in accordance with Equation 1.

In conjunction with the visual surface roughness index or transition regions 311 (in FIG. 3B) derived from the visual surface roughness index, the ground speed module 59 can be operated in accordance with various examples, which may be applied separately or cumulatively. Under a first example, prior to reaching a next transition region 311, a ground speed module 59 is configured to estimate a next ground speed setting for the vehicle (and/or its implement) consistent with alignment and/or overlap of the determined position, the estimated zones and the established transition region. Under a second example, at the entrance point or beginning of the next transition region 311, an electronic data processor 18 and/or ground speed module 59 control an actuator (e.g., electric drive motor 524) and/or propulsion system 46 (e.g., via a propulsion controller 44) to increase or increment the ground speed setting for one or more primary corresponding zones with a surface roughness index range that is less than (or equal to) a limit (e.g., previous lower limit of surface roughness p) of a previous zone threshold that the vehicle, or its implement, is exiting. Under a third example, at the entrance point or beginning of the next transition region 311, an electronic data processor 18 and/or ground speed module 59 control an actuator (e.g., electric drive motor 524) and/or propulsion system 46 (e.g., via a propulsion controller 44) to decrease or decrement the ground speed setting for one or more secondary corresponding zones with a surface roughness index range that is greater than (or equal to) a limit (e.g., previous upper limit) of the previous zone threshold to transition between the different ground speed settings that the vehicle, or its implement is exiting.

The second location-determining receiver 110 is the same or similar to the location-determining receiver 10, which may be referred to as the first location determining receiver. However, the first location-determining receiver may be mounted on or in the vehicle 82, or its implement (83, 500). If both a first location-determining receiver 10 and second location-determining receiver 110 are present, the second location-determining receiver is typically mounted on or in the implement (83, 500) and the first location-determining receiver is mounted on or in the vehicle 82. The wireless communications device 147 is the same or similar to the wireless communications device 47. For example, the wireless communications device 147 is coupled to the second location-determining receiver 110 to provide correction data to it.

Figure 2A:
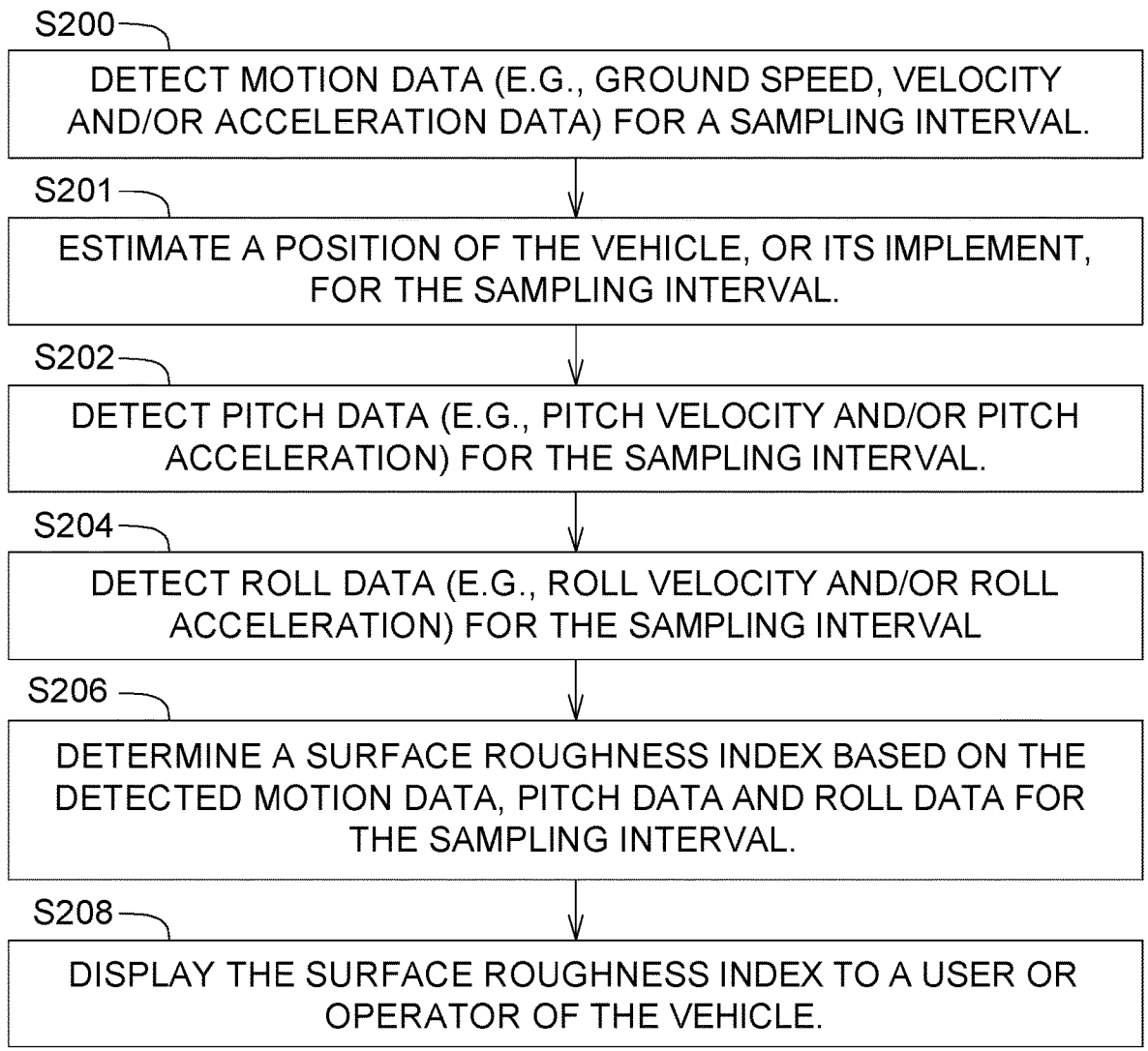
FIG. 2A is a flow chart of a first embodiment of a method for estimating surface roughness of ground for an off-road vehicle to control ground speed of the off-road vehicle, its implement, or both.

FIG. 2A is a flow chart of a first embodiment of a method for estimating surface roughness of ground for an off-road vehicle to control ground speed of the vehicle, its implement, or both. The method of FIG. 2 begins in step S200.

In step S200, a motion sensor, such as a location-determining receiver 10, detects motion data of an off-road vehicle (e.g., 82 in FIG. 4) traversing a field or work site (e.g., as illustrated in FIG. 3A or FIG. 3B, or otherwise) during a sampling interval or multiple sampling intervals. For example, the motion data comprises at least ground speed of the off-road vehicle.

In an alternate embodiment, the motion data may comprise any of the following measured or observed at the vehicle, the implement or both: ground speed, velocity, acceleration data for one or more sampling intervals In one embodiment, the motion sensor may comprise an odometer, a speedometer, a dead-reckoning sensor, an accelerometer 54, an inertial sensor module 56, a three-axis accelerometer assembly, a gyroscope 55, an inertial measurement unit (IMU) (53, 153), a radar system, a LIDAR system (e.g., light/laser detection and ranging), a satellite navigation receiver, a location-determining receiver (10, 110), or a satellite navigation receiver with a wireless device for receiving correction data (e.g., differential correction data). A radar system may comprise a transmitter that transmits an encoded signal (e.g., pulse, pseudo-random noise code, or continuous waveform) toward an object and a receiver (e.g., doppler receiver) that receives a reflection of the coded signal from the object to determine a range, bearing, and/or velocity of an object. A location-determining receiver (10, 110) refers to a satellite navigation receiver with or without differential correction, along with a wireless communications device (47, 147) that can provide position, location, motion or attitude data from one or more terrestrial transmitter beacons on land or satellite transmitters in orbit about the Earth.

In step S201, a location-determining receiver (10, 110) (e.g., satellite navigation receiver) estimates or provides a respective position of the vehicle (e.g., 82), its implement (e.g., 83), for the sampling interval.

In step S202, a pitch sensor 256 or inertial sensor module 56 detects pitch data of the off-road vehicle for the sampling interval to obtain a pitch acceleration. The pitch sensor 256 may comprise an accelerometer or IMU (53, 153) that is configured to measure the pitch angle or attitude of the vehicle, its implement. The pitch sensor 256 may be mounted on the vehicle to measure the pitch angle or attitude of the vehicle, whereas the pitch sensor 256 may be mounted on the implement or each row unit 66 to measure the pitch angle or attitude of the implement or row unit 66 of the implement.

Further, the pitch sensor 256 or inertial sensor module 56 may be coupled to an analog-to-digital (A/D) converter that converts analog pitch angle to digital signal. After the analog-to-digital converter digitizes the signal, the data processing system 14 may apply the electronic data processor 18 (and clock) to determine or derive the pitch angle velocity or pitch angle acceleration from the digital pitch angle. For example, the electronic data processor 18 may take the second derivative of the pitch angle with respect to time to determine the estimated pitch angle acceleration for one or more sampling intervals.

In step S204, a roll sensor 156 or inertial sensor module 56 detects roll data of the off-road vehicle for the sampling interval to obtain a roll acceleration. The roll sensor 156 may comprise an accelerometer or IMU (53, 153)) that is configured to measure the roll angle or attitude of the vehicle (e.g., 82), its implement (e.g., 83, or one or more row units 66). The roll sensor (e.g., 156) may be mounted on the vehicle, to measure the roll angle or attitude of the vehicle, whereas the roll sensor (e.g., 156) may be mounted on the implement or each row unit 66 to measure the roll angle or attitude of the implement or row unit 66 of the implement.

Further, the roll sensor 156 or inertial sensor module 56 may be coupled to a analog-to-digital (A/D) converter that converts analog roll angle to digital signal. After the analog-to-digital converter digitizes the signal, the data processing system 14 may apply the electronic data processor 18 (and clock) to determine or the roll angle velocity or roll angle acceleration from the digital roll angle. For example, the electronic data processor 18 may take the second derivative of the roll angle with respect to time to determine the estimated roll angle acceleration for one or more sampling intervals.

In step S206, an electronic data processor 18, the surface roughness estimator 57, or the surface roughness index estimator module 62 determines or estimates a surface roughness index for a cell or zone of the field or work area based on the detected motion data, pitch data and roll data for the sampling interval.

The surface roughness index (p) for a corresponding point, path segment (e.g., linear path segment), zone, cell, region, strip, portion or area of the field or work site may be determined in accordance with the following equation ("Equation 1"):

$$\rho = \frac{RMS(A_{Pitch}) + RMS(A_{Roll})}{s},$$

where $RMS(A_{Pitch})$ is equal to root-mean-squared, angular pitch acceleration in meters per second squared (m/s$^2$); RMS ($A_{Roll}$) is equal to root-mean-squared, angular roll acceleration in meters per second squared (m/s$^2$), and S refers to speed in meters per second (m/s) of the vehicle or the implement in conjunction with a corresponding point, path segment (e.g., linear path segment), zone, cell, region, strip, portion or area of the field or work site in which samples (e.g., pitch or roll measurements) or observations were made.

RMS(APitch) can be determined by firstly squaring each observed angular pitch acceleration in a set of (raw) samples (e.g., collected during a sampling interval, such as for N raw samples: $A_{Pitch1}^2 + A_{Pitch2}^2 + \ldots A_{PitchN}^2$), by secondly determining a mean of the set of squared samples (e.g., divided by the total number N of samples), and by thirdly taking a square root of the determined mean in accordance with the following equation ("Equation 2"):

$$RMS(APitch) = \sqrt{(A_{Pitch1}^2 + A_{Pitch2}^2 + ... A_{PitchN}^2)/N},$$

where $A_{Pitch1}^2$ is the square of the first sample of observed angular pitch acceleration (in meters per second squared); $A_{Pitch2}^2$ is the square of the second sample of observed angular pitch acceleration (in meters per second squared); and $A_{PitchN}^2$ is the square of the Nth sample or last sample among N total samples, where N is equal to any whole positive number equal to or greater than three.

RMS(ARoll) can be determined by firstly squaring each observed angular roll acceleration in a set of (raw) samples (e.g., collected during a sampling interval, such as for N raw samples: $A_{Roll1}^2 + A_{Roll2}^2 + ... A_{RollN}^2$), by secondly determining a mean of the set of squared samples (e.g., divided by the total number N of samples), and by thirdly taking a square root of the determined mean in accordance with the following equation ("Equation 3"):

$$RMS(ARoll) = \sqrt{(A_{Roll1}^2 + A_{Roll2}^2 + ... A_{RollN}^2)/N},$$

where $A_{Roll1}^2$ is the square of the first sample of observed angular roll acceleration (in meters per second squared); $A_{Roll2}^2$ is the square of the second sample (in meters per second squared), and $A_{RollN}^2$ is the Nth sample or last sample among N total samples, where N is equal to any whole positive number equal to or greater than three.

Throughout this disclosure, a zone for a corresponding surface roughness index (range) may be defined by various attributes or characteristics as set forth in the following examples, which may be applied separately or cumulatively. In a first example, each zone (of corresponding surface roughness index) may comprise a cell of uniform size or uniform dimensions through the field or work site, such as a zone or region with a polygonal boundary (e.g., triangular, rectangular, hexagonal or pentagonal), or a region with another geometric shape. In a second example, each zone (of corresponding surface roughness index) comprises a substantially rectangular strip associated with the vehicle width or swath, or the implement width or swath, such as a physical lateral dimension of the implement, the vehicle or its wheelbase. In third example, each zone a zone comprises a region with a curved contour or any other shape, where the surface area roughness for a corresponding zone is associated with: (a) a uniform surface roughness index mean, average, mode, or median, or (b) a defined range of surface roughness index, where each range has a lower limit and an upper limit.

In step S208, the display 25 or user interface 22 displays or provides a representation of the surface roughness index by respective position (e.g., two or three dimensional coordinates) to a user or operator of the vehicle. Further, the electronic data processor 18 may collect and store regularly the surface roughness index by respective position in a data storage device 24 to create a data map 301 (e.g., in FIG. 3A and FIG. 3B) of surface roughness index versus respective positions. For manned vehicles, the graphical display 25 can be presented on a display 25 within the vehicle or, for unmanned vehicles, remotely from the vehicle via a wireless link.

In one configuration, the user interface 22 or display 25 may display a numerical indication, ranking or other visual indicator of one or more ranges of surface roughness index that is determined or provided by the data processor 18, the surface roughness estimator 57, or the surface roughness index estimator 62. For example, in accordance with the above equation, the surface roughness index may be scaled or normalized to have a value of surface roughness index: (a) between 0 to 10, where 10 indicates a maximum surface roughness index and 0 indicates the minimum surface roughness index; or (b) between 0 to 10, where 10 indicates a maximum surface roughness index and 0 indicates the minimum surface roughness index.

The surface roughness index may be organized or classified in accordance with various examples, which may be applied separately or cumulatively. Under a first example, the above Equation 1 may provide a surface roughness index (ρ) that may be divided into two ranges, such as a first range and a second range. Under a second example, the above Equation 1 may provide a surface roughness index (ρ) that may be divided into the following two ranges: (1) normal and elevated; (2) smooth and rough; (3) acceptable and unacceptable. Under a third example, the typical range of surface roughness index (ρ) may range between two ranges that are determined by the mode or median value of estimated surface roughness in accordance with the above Equation 1. In a fourth example, the typical range of surface roughness index (ρ) may range between two ranges that are determined as follows: (a) smooth, conditioned for planting, which is defined as surface roughness index from approximately 1 to 15; (b) rough, primary tillage (ripped ground), which is defined a surface roughness index (ρ) from approximately 16-35, where approximately means a tolerance of plus or minus ten percent.

Figure 2B:
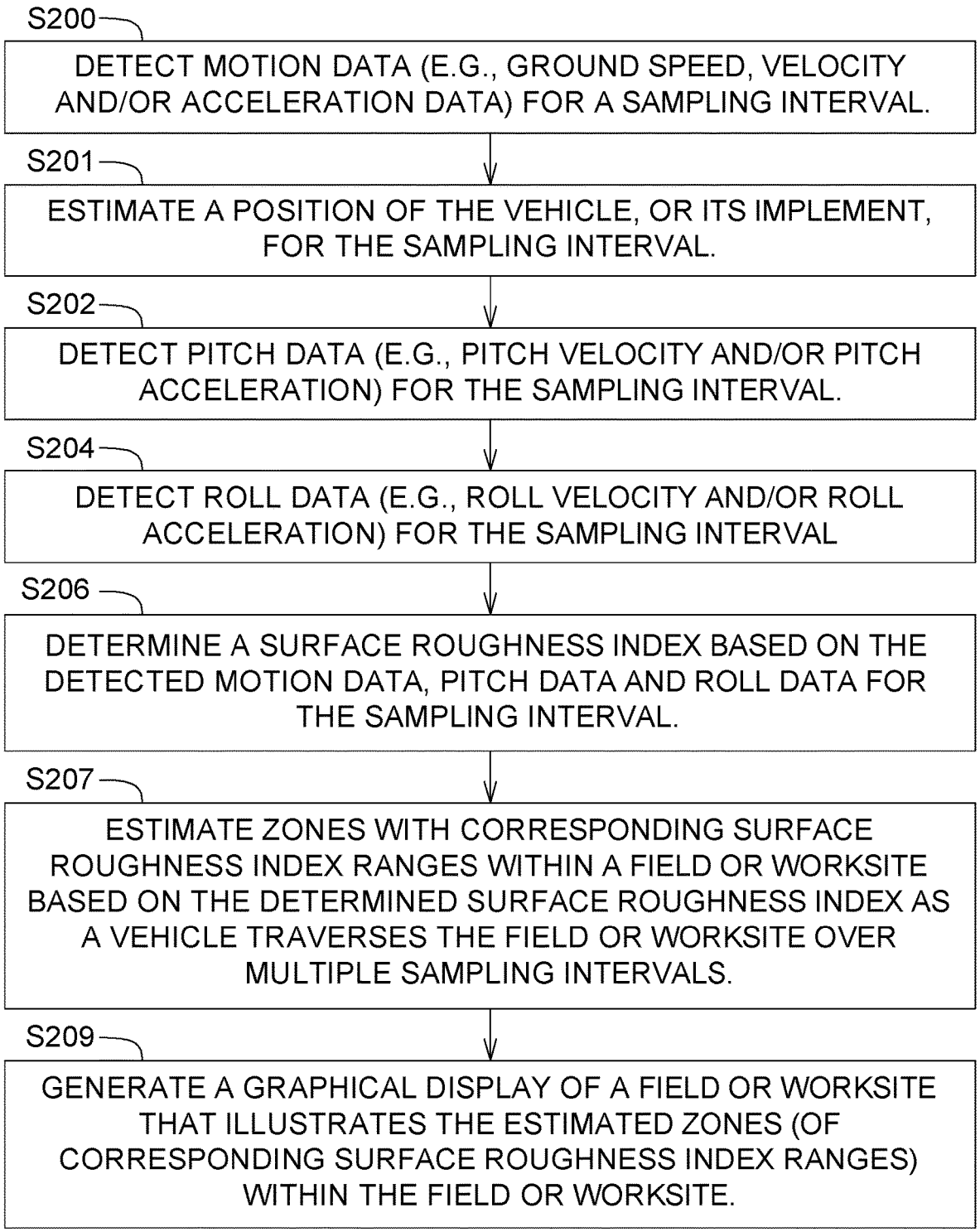
FIG. 2B is a flow chart of a second embodiment of a method for estimating surface roughness of ground for an off-road vehicle to control ground speed of the off-road vehicle, its implement, or both.

FIG. 2B is a flow chart of a second embodiment of a method for estimating surface roughness of ground for an off-road vehicle to control ground speed of the vehicle, its implement, or both. Like reference numbers in FIG. 2A and FIG. 2B indicate like steps or procedures.

In step S207, the electronic data processor 18, the surface roughness estimator 57, or surface roughness index estimator 62 is configured to estimate zones (e.g., cells) with corresponding surface roughness index ranges within a field or work site based on the determined surface roughness index versus positions (e.g., two or three dimensional coordinates) as a vehicle (e.g., 82) traverses or traversed the field or work site over multiple sampling intervals. For example, the electronic data processor 18, the surface roughness estimator 57, or surface roughness index estimator 62 collects a series of positions versus determined surface roughness index and classifies, ranks, clusters, groups or processes like surface roughness index within corresponding sets of non-overlapping ranges to create respective zones (e.g., to form a data map 301 in FIG. 3A and FIG. 3B). In one configuration as illustrated in hypothetical example of FIG. 3A, the non-overlapping ranges may comprise one or more of the following: a first zone 308 associated with a first range of surface roughness index values bounded by a first lower limit and a first upper limit of surface roughness index; a second zone 309 associated with a second range of surface roughness index values bounded by a second lower limit and a second upper limit of surface roughness index, and a third zone 310 associated with a third range of surface roughness index values bounded by a third lower limit and a third upper limit of surface roughness index.

The method of FIG. 2B may be deployed iteratively as survey of a corresponding field or work site each year or growing season, or as frequently as required to update surface roughness index information as recommended by civil engineering consultants, agronomists, soil experts or others. FIG. 3A provides one illustrative example of data maps 301 of zones of the corresponding surface index values that can be stored and retrieved on a field or work site for growing season or from the last growing season for application to a next growing season.

The data maps 301 or underlying data for surface index values versus zones may be stored on a data storage device 24 of the data processing system 14 or uploaded to a central server or a cloud computing service for retrieval by a different data processing system 14 on another subsequent vehicle or subsequent implement for performing a subsequent agronomic task in a growing season.

In step S209, the electronic data processor 18, surface roughness index estimator 62, or surface roughness estimator 57 can generate a graphical display 25 that illustrates the estimated zones of corresponding surface roughness or index ranges within the field or work site.

Figure 2C:
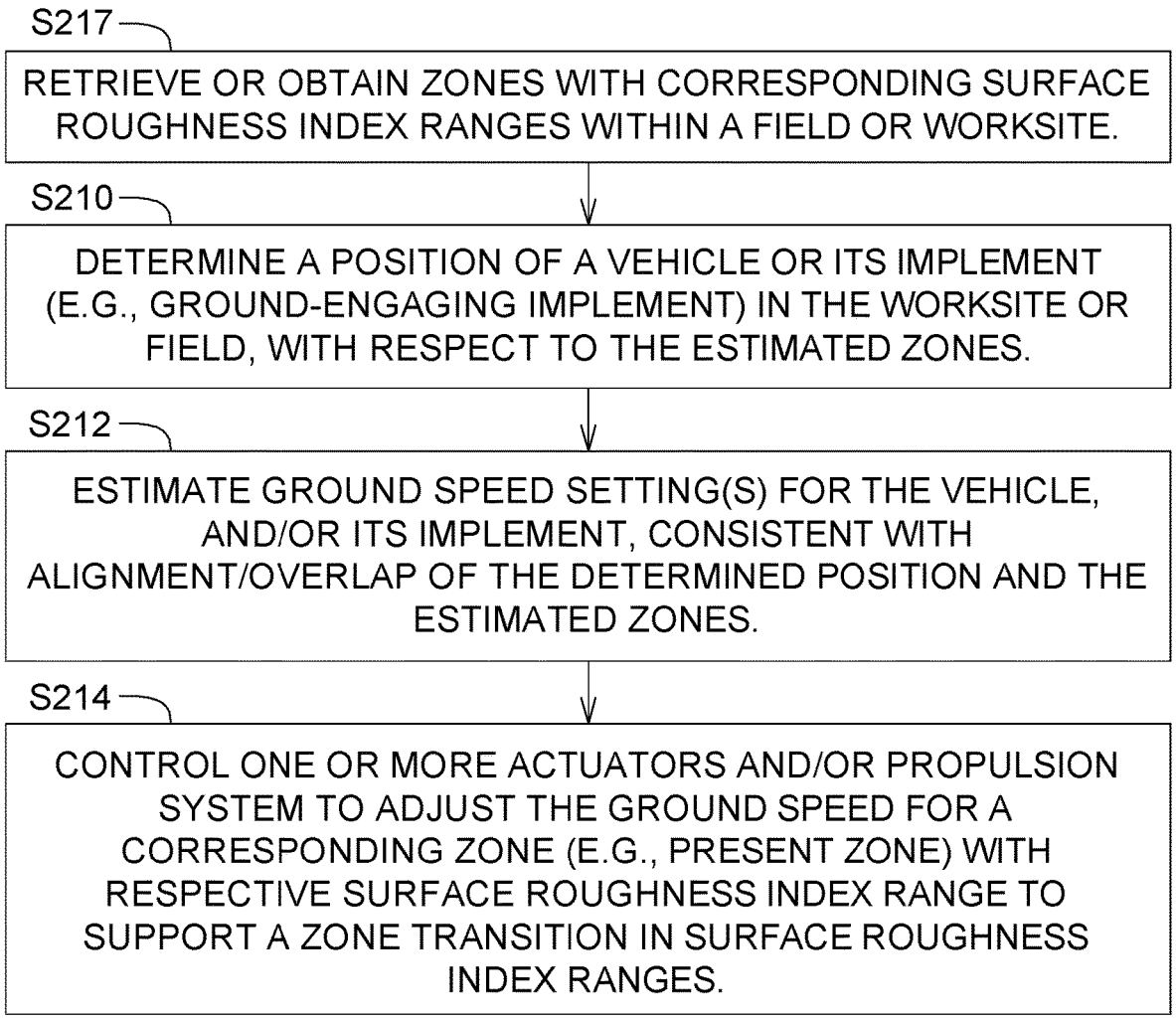
FIG. 2C is a flow chart of a third embodiment of a method for estimating surface roughness of ground for an off-road vehicle to control ground speed of the off-road vehicle, its implement, or both.

FIG. 2C is a flow chart of a third embodiment of a method for estimating surface roughness of a ground for an off-road vehicle to control ground speed of the off-road vehicle, its implement, or both.

In step S217, the electronic data processor 18 retrieves or obtain zones with corresponding surface roughness index ranges with a field or work site. For example, the electronic data processor 18 retrieves or obtains stored zones (e.g., in a data storage device 24) with corresponding surface roughness index ranges with a field or work site. Further, the stored zones with corresponding surface roughness index ranges may arise from previous step S207 of FIG. 2B, based on determined surface roughness index for a vehicle that traversed the field or work site.

In the method of FIG. 2A or FIG. 2B in preparation for step S217 of FIG. 2C, the data maps 301 or underlying data for surface index values versus zones may be stored on a data storage device 24 of the data processing system 14 or uploaded to a central server or a cloud computing service (e.g., with data storage devices) for retrieval by a different data processing system 14 on another subsequent vehicle or subsequent implement for performing a subsequent agronomic task in a growing season. For instance, an earlier vehicle (e.g., survey vehicle or reconnaissance vehicle, such as vehicle 82 without implement 83) may provide a survey service for collecting that data maps 301 of surface roughness index zones (e.g., incidental to the method of FIG. 2B), while a subsequent vehicle and/or implement (e.g., a combination of vehicle 82 with implement 83) may perform a tillage or planting operation (e.g., in FIG. 2C), or spraying operation (e.g., sprayer implement 500, or boom with nozzles required); where the earlier vehicle electronics and subsequent vehicle electronics (e.g., systems 11, 111 or data processing systems (e.g., 14)) can exchange or share data (e.g., estimated in step S207 of FIG. 2B for retrieval in step S217 of FIG. 2C) via the data storage device 24, the central service or cloud, with appropriate consent for processing, exchanging or sharing the data.

In an alternate embodiment, step S217 of FIG. 2C may be replaced by step S207 of FIG. 2B.

In step S210, the location determining receiver (10, 110) determines or estimates a position (e.g., in two or three dimensional coordinates) of the vehicle, or its implement in the work site or field with respect to the estimated zones (e.g., 308, 309, 310 in FIG. 3A) of different corresponding surface roughness index ranges.

In step S212, an electronic data processor 18, a ground speed module 59, or a surface roughness management module 60 estimates or generates and/or sends one or more ground speed settings (e.g., ground speed limit, a maximum ground speed, target ground speed, target ground speed range) for the vehicle, and/or its implement (e.g., steerable implement), consistent with alignment and/or overlap of the determined position of the implement and the estimated zones (e.g., 308, 309, 310 in FIG. 3A). For example, in step S212, an electronic data processor 18, a ground speed module 59, or a surface roughness management module 60 estimates or generates and/or sends one or more ground speed settings to control one or more actuators (e.g., one or more electric drive motors 524) and/or propulsion system 46 (e.g., via a propulsion controller 44), consistent with alignment and/or overlap of the determined position of the implement and the estimated zones (e.g., 308, 309, 310 in FIG. 3A).

In an alternate embodiment of step S212, an electronic data processor 18, a ground speed module 59, or a surface roughness management module 60 estimates or generates and/or sends one or more ground speed settings to control a braking system 50 (e.g., via braking controller 48) consistent with alignment and/or overlap of the determined position of the implement and the estimated zones (e.g., 308, 309, 310 in FIG. 3A.

In another alternate embodiment of step S212, the electronic data processor 18, a ground speed module 59, and/or a surface roughness management module 60 may estimate one or more ground speed settings (and dynamically adjust in real time) for the vehicle, and/or its steerable implement 500 consistent with alignment and/or overlap of the determined position of the implement 500 and the estimated zones. Further, the electronic data processor 18 and data processing system 14 may support simultaneous estimation of ground speed settings and steering gain settings for separate or joint application to the propulsion system 46 (or propulsion system 46 in conjunction with braking system 50) and the steering system 42, respectively. Separately or cumulatively with the vehicle steering system 42 that is responsive to (vehicle) steering gain settings, the implement 500 (in FIG. 5) features actuator-controlled steerable wheels or steerable tracks that are steered by implement steering actuator 509 implement steering controller 510 that is responsive to (implement) steering gain settings.

In step S214, the electronic data processor 18, the ground speed module 59, and/or the surface roughness management module 60 controls the propulsion system 46, the braking system 50, or one or more electric drive motors 524, or any combination of the forgoing items (46, 50, 524) to adjust (e.g., increase or decrease) the ground speed setting for a corresponding zone (e.g., present zone) with a respective surface roughness index range to support a zone transition or changes in surface roughness index ranges between spatially adjacent different estimated zones, such as a transition between a previous zone and present zone (of respective different surface roughness index ranges) that share a common boundary. As used throughout this document, the propulsion system 46 may include one or more actuators, such as electric drive motors, if the propulsion system 46 is configured as a hybrid or electric vehicle. Similarly, the one or more electric drive motors 524 (e.g., of the implement 5000 may represent one or more actuators.

Each zone has corresponding limits (e.g., a lower limit and an upper limit that collectively define the zone) or zone thresholds for its respective surface roughness index range. In other words, the ground speed module 59, and/or the surface roughness management module 60 controls the propulsion system 46, the braking system 50, or one or more electric drive motors 524, or any combination of the forgoing items (46, 50, 524) to adjust (e.g., increase or decrease) the ground speed setting for a corresponding zone with a respective surface roughness index range to support a transition or changes in surface roughness index ranges between spatially adjacent different limits or different zone thresholds. Further, the availability of the braking system 50 and one or more (implement) electric drive motors 524 (in braking mode and/or power regeneration mode) allows even heavily loaded vehicles and/or implements (e.g., loaded with harvested crop, seeds, or crop inputs) to undergo responsive and efficient deceleration or acceleration in accordance with one or more target ground speed settings for one or more corresponding sampling intervals. Accordingly, the method is well-suited for operation of vehicles and implements in hilly terrain or undulating terrain, cumulatively with surface roughness index measurements associated with such hilly terrain or undulating terrain that inform ground speed settings, along with the relevant requirements attendant to particular agricultural tasks, such as spraying, planting, seeding, or other agricultural or agronomic tasks performed by the work vehicle and/or its implement.

Step S214 may be executed in accordance with various techniques that may be applied separately or cumulatively. Under a first technique, the electronic data processor 18, the ground speed module 59, and/or surface roughness management module 60 sends control messages or control data (e.g., one or more ground speed settings) to control the propulsion system 46, the braking system 50, or one or more electric drive motors 524, or any combination of the forgoing items (46, 50, 524) to adjust (e.g., increase, increment, decrease, or decrement) one or more present ground speed settings (e.g., vehicle ground speed setting, implement ground speed setting, or both) for corresponding presently applicable zones (e.g., one or more upcoming zones) with respective surface roughness index ranges that: (a) are outside the limits (of corresponding surface roughness index ranges) for presently applicable zones consistent with the present determined position of the vehicle and the estimated zones, and/or (b) are different than the limits (of corresponding surface roughness index ranges) of previously applicable zones consistent with the previously determined position of the vehicle and the estimated zones. Present ground speed settings or present ground speeds are applicable to respective present zones or presently applicable zones (of corresponding surface roughness index ranges), where presently applicable zones may comprise one or more zones that are presently occupied by the vehicle, and/or its implement, and/or upcoming zones. Previous ground speed settings or previous ground speeds are applicable to respective previous zones or previously applicable zones (of corresponding surface roughness index ranges), where previously applicable zones may comprise one or more zones that were previously occupied by the vehicle, and/or its implement, such as previously applicable zones that intercept a path plan of the vehicle and/or its implement immediately prior to reaching the present zone.

Under a second technique, the electronic data processor 18, the ground speed module 59, and/or surface roughness management module 60 sends control messages or control data (e.g., ground speed settings, vehicle ground speed settings, or implement ground speed settings) to control the propulsion system 46, the braking system 50, or one or more (implement) electric drive motors 524, or any combination of the forgoing items (46, 50, 524) to increase or increment the present ground speed setting for a corresponding zone transition (e.g., of vehicle position and/or implement position) from a greater surface area roughness zone (e.g., previous zone with a higher average or mean $\rho$) to a lesser surface area roughness zone (e.g., present zone with a lower average or mean $\rho$), where the lesser surface area zone (e.g., present zone) has a lesser surface area roughness index range (e.g., lower average or mean $\rho$) than a greater surface area roughness index range (e.g., higher average or mean $\rho$) of the greater surface area roughness zone (e.g., previous zone). The previous zone and the present zone may share a common spatial boundary; the vehicle or its implement may follow or trace a path plan that firstly intercepts or falls within the previous zone and secondly intercepts or falls within the present zone.

Under a third technique, the electronic data processor 18, the ground speed module 59, and/or surface roughness management module 60 sends control messages or control data (e.g., ground speed settings, vehicle ground speed settings, or implement ground speed settings) to control the propulsion system 46, the braking system 50, or one or more electric drive motors 524, or any combination of the forgoing items (46, 50, 524) to decrease or decrement the present ground speed setting for a corresponding zone transition (e.g., of vehicle position and/or implement position) from a lesser surface area roughness zone (e.g., previous zone with a lower average or mean $\rho$) to a greater surface area roughness zone (e.g., present zone with a higher average or mean $\rho$), where the lesser surface area zone (e.g., previous zone) has a lesser surface area roughness index range (e.g., lower average or mean $\rho$) than a greater surface area roughness index range (e.g., higher average or mean $\rho$) of the greater surface area roughness zone (e.g., present zone). The previous zone and the present zone may share a common spatial boundary; the vehicle or its implement may follow or trace a path plan that firstly intercepts or falls within the previous zone and secondly intercepts or falls within the present zone.

Under a fourth technique, the electronic data processor 18, the ground speed module 59, and/or surface roughness management module 60 sends control messages or control data (e.g., ground speed settings) to control the propulsion system 46, the braking system 50, or one or more electric drive motors 524, or any combination of the forgoing items (46, 50, 524) to increase or increment the ground speed setting for corresponding next zone (e.g., upcoming zones) with respective surface roughness index ranges that: (a) are outside the limits (of a respective present surface roughness range) of a present zone consistent with the present determined position of the vehicle and the estimated boundaries of present and next zones, and (b) represent a zone transition (e.g., of vehicle position and/or implement position) from a greater surface roughness in a respective present zone to a lower surface roughness in a respective next zone, where the lesser surface area zone (e.g., next zone) has a lesser surface area roughness index range (e.g., lower average or mean $\rho$) than a greater surface area roughness index range (e.g., higher average or mean $\rho$) of the greater surface area roughness zone (e.g., present zone).

Under a fifth technique, the electronic data processor 18, the ground speed module 59, and/or surface roughness management module 60 sends control messages or control data (e.g., ground speed settings) to control the propulsion system 46, the braking system 50, or one or more electric drive motors 524, or any combination of the forgoing items (46, 50, 524) to adjust to decrease or decrement the ground speed setting for corresponding next zone (e.g., upcoming zones) with respective surface roughness index ranges that: (a) are outside the limits (of a respective present surface roughness range) of a present zone consistent with the present determined position of the vehicle and the estimated boundaries of present and next zones, and (b) represent a zone transition (e.g., of vehicle position and/or implement position) from a lesser surface roughness in a respective present zone to a greater surface roughness in a respective next zone, where the lesser surface area zone (e.g., present zone) has a lesser surface area roughness index range (e.g., lower average or mean ρ) than a greater surface area roughness index range (e.g., higher average or mean ρ) of the greater surface area roughness zone (e.g., next zone).

Figure 2D:
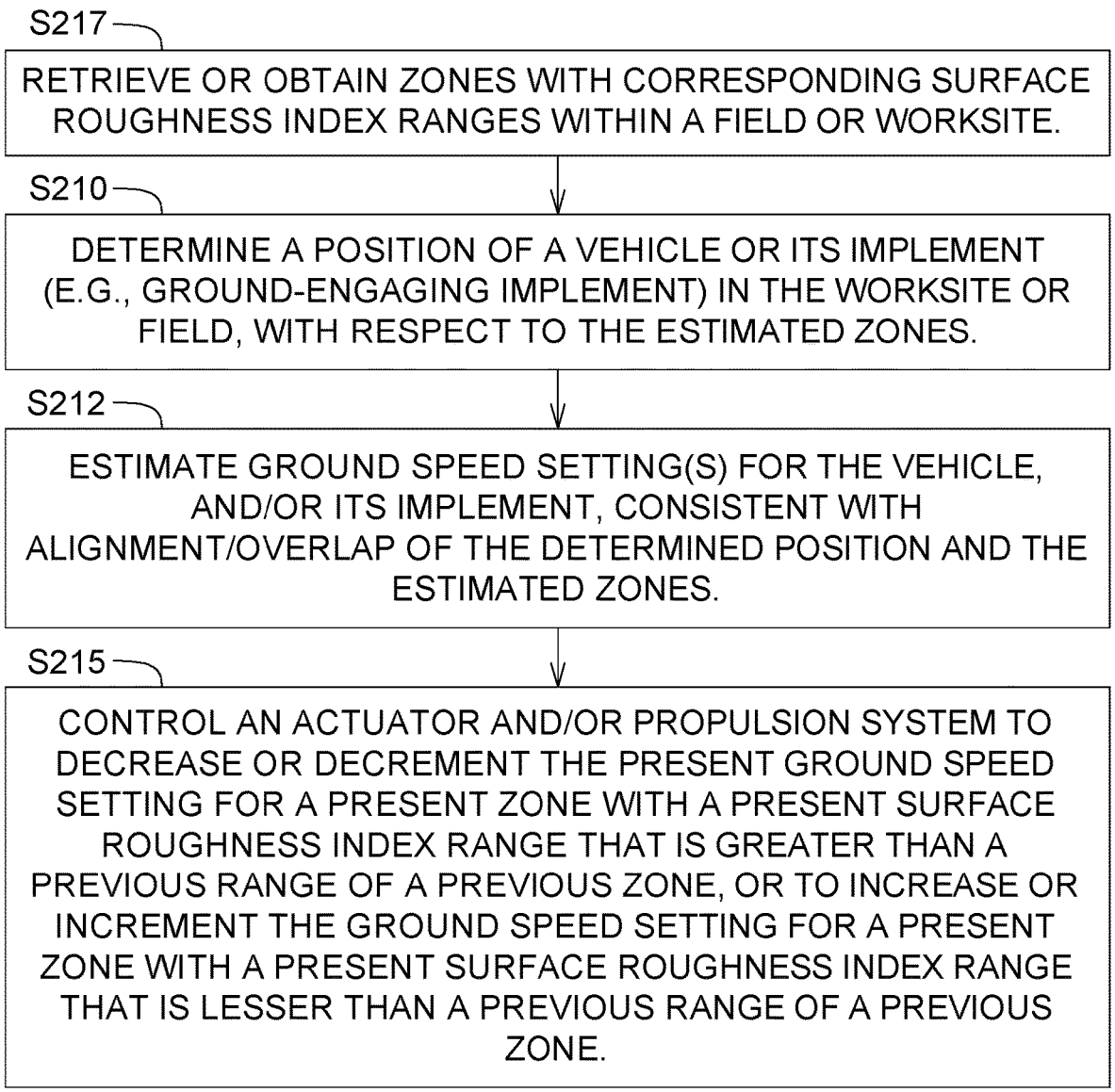
FIG. 2D is a flow chart of a fourth embodiment of a method for estimating surface roughness of ground for an off-road vehicle to control ground speed of the off-road vehicle, its implement, or both.

FIG. 2D is a flow chart of a fourth embodiment of a method for estimating surface roughness of a ground for an off-road vehicle to control an implement, its implement, or both. Like reference numbers in FIG. 2C and FIG. 2D indicate like steps or procedures.

In step S215, an electronic data processor 18, the ground speed module 59, and/or the surface roughness management module 60 generates and sends a control message or control data (e.g., ground speed setting) to control the propulsion system 46, the braking system 50, or one or more electric drive motors 524, or any combination of the forgoing items (46, 50, 524) to adjust: (a) to decrease or decrement the present ground speed setting for a present zone with a present surface roughness index range that is greater than a previous zone or exited zone with previous surface roughness index range, where the vehicle and/its implement has moved, transitioned or exited from the previous zone into the present zone; where present zone may be referred to a primary zone associated with a primary lower limit and primary upper limit; where the previous zone may be associated with a previous lower limit and previous upper limit; and where primary lower limit is equal to or greater than the previous upper limit; and (b) to increase or increment the present ground speed setting for a present zone with a present surface roughness index range that is lesser than a previous zone or exited zone with previous surface roughness index range, where the vehicle and/its implement has moved, transitioned or exited from the previous zone into the present zone; where present zone may be referred to a secondary zone associated with a secondary lower limit and secondary upper limit; where the previous zone may be associated with a previous lower limit and previous upper limit; and where secondary upper limit is equal to or less than the previous lower limit.

The electronic data processor 18, the ground speed module 59, and/or the surface roughness management module 60 determines whether to decrease or increase the ground speed setting based upon the present position of the vehicle relative to the zone; that is whether the present zone is occupied by the vehicle and/or its implement, or whether a next zone is to be occupied by the vehicle and/or its implement. As the vehicle and/or its implement approaches, reaches, intercepts, or passes a boundary between different zones with different surface roughness index ranges, the electronic data processor 18, the ground speed module 59, and/or the surface roughness management module 60 determines whether to decrease or increase the ground speed setting in a transition region that may overlap with the boundary, the present zone (exiting zone) and the next zone (entering zone).

Step S215 may further comprise one or more of the following aspects related to the boundaries between adjacent zones:

Under a first aspect of step S215, if the electronic data processor 18, the guidance module 26 and/or the location-determining receiver (10, 110) determines that a position of the vehicle and/or its implement (e.g., observed path plan) coincides with, crosses or reaches a boundary between a present zone and a next zone (e.g., upcoming zone) from a present zone, the electronic data processor 18, the ground speed module 59, and/or the surface roughness management module 60 is configured (e.g., triggered) to decrease or decrement the ground speed setting(s) (e.g., at the propulsion system, the braking system or both) for corresponding next zone with a next surface roughness index range that are greater than a present surface index range of a present zone. Conversely, under a second aspect of step S215, if the electronic data processor 18, the guidance module 26 and/or the location-determining receiver (10, 110) determines that a position of the vehicle and/or its implement (e.g., observed path plan) coincides with, crosses or reaches a boundary between a present zone and a next zone (e.g., upcoming zone) from a present zone, the electronic data processor 18, the ground speed module 59, and/or the surface roughness management module 60 is configured (e.g., triggered) to increase or increment the ground speed setting (e.g., at the propulsion system 46, the braking system 50, or both) for corresponding next zone with a next surface roughness index range that are lesser than a present surface index range of a present zone.

In an alternate embodiment, step S217 of FIG. 2D may be replaced by step S207 of FIG. 2B.

FIG. 2E is a flow chart of a fifth embodiment of a method for estimating surface roughness of a ground for an off-road vehicle to control ground speed of a vehicle, its implement, or both. Like reference numbers in FIG. 2C and FIG. 2D indicate like steps or procedures. The method of FIG. 2E is similar to the method of FIG. 2C, except the method of FIG. 2E further comprises image data enhancement of surface field roughness estimations. Like reference numbers in FIG. 2A through FIG. 2E, inclusive, indicate like steps, procedures or features.

In step S211, an imaging device (e.g., stereo camera) collects image data of the field or work site in a forward field of view of the vehicle. The forward field of view may include one or more cells, zones or regions of the field or work site, along with one or more reference points (e.g., temporary two or three dimensional reference markers that can be removed or not displayed to an end user) that can augment or supplement the collected image data to facilitate aligning successive images to create (e.g., stitch together) an aggregate image.

In step S213, a data processor 18, surface roughness estimator 57, or visual surface roughness index estimator 32 estimates a visual surface roughness index for the collected image data within the field of view to establish a transition between different estimated ground speed zones. For example, a data processor 18, surface roughness estimator 57, or visual surface roughness index estimator 32 estimates a visual surface roughness index for the collected image data within one or more regions, zones or cells within a field of view to establish a transition (e.g., transition regions 311) between different estimated ground speed zones (e.g., zones 308, 309, 310).

In step S216, prior to reaching a next transition region 311, the data processor 18, a ground speed module 59, and/or surface roughness management module 60 estimates a next ground speed setting for the vehicle and/or implement consistent with alignment and/or overlap of the determined position, the estimated zones (e.g., 308, 309, 310) and the established transition region(s) 311. For example, prior to reaching a next transition region 311 during a look-ahead preparation period, the data processor 18, a ground speed module 59, and/or surface roughness management module 60 estimates a ground speed setting for the vehicle and/or implement consistent with alignment and/or overlap of the determined position, the estimated zones (e.g., 308, 309, 310) and the established transition region(s) 311.

In step S218, at the entrance point or beginning of the next transition region, a data processor 18, the ground speed module 59, and/or surface roughness management module 60 controls, directly or indirectly, the propulsion system 46, the braking system 50, or one or more electric drive motors 524, or any combination of the forgoing items (46, 50, 524) to increase or increment the next ground speed setting for one or more (present) primary corresponding zones (e.g., 308, 309, 310) with a surface roughness index range or ranges that are lesser than a limit (e.g., an lower limit) of a previous zone threshold (e.g., secondary zone threshold) that the vehicle, or its implement, is exiting. Alternately, or in any later sampling period, in step S218 at the entrance point or beginning of the next transition region, data processor 18, the ground speed module 59, and/or surface roughness management module 60 controls, directly or indirectly, the propulsion system 46, the braking system 50, or one or more electric drive motors 524, or any combination of the forgoing items (46, 50, 524) to decrease or decrement the next ground speed setting for one or more secondary corresponding zones (e.g., 308, 309, 310) with a surface roughness index range or ranges that are greater than a limit (e.g., an upper limit) of the previous zone threshold (e.g., primary zone threshold) to transition between the different ground speed settings that the vehicle, or its implement, is exiting.

FIG. 3A is a plan view of a first illustrative data map 301 of surface roughness zones within a hypothetical field. FIG. 3A shows an illustrative path plan of a field in which the vehicle (e.g., 82) or the vehicle and its implement (e.g., 83) travels a circuitous path in generally parallel rows 302 (e.g., substantially linear segments) such that, in the aggregate after completing many rows, columns or passes, the swath or width of the implement covers a substantially an entire area within a field or work site. The field has boundaries, such as side edges 306 and end boundaries 307. As illustrated, at the end of each end boundary 307, the vehicle makes an end turn 303 of approximately one-hundred and eighty degrees to return to the next adjacent row. There may be no overlap of the swath of the vehicle or implement between adjacent rows 302, or there may be a slight overlap between adjacent rows 302 that assure that there is no or minimal gap in coverage where the implement is a sprayer, a planter or another device.

On the right side of the field, there is a keep-out area 305 (e.g., hazard), such as a waterway, wetland, swamp or drainage area, or channel that cannot be traversed by the vehicle or implement. Accordingly, the path plan and its path segments 304 are directed around the keep-out area 305.

In one configuration, the non-overlapping ranges may comprise one or more of the following: a first zone 308 associated with a first range of surface roughness index values bounded by a first lower limit and a first upper limit of surface roughness index; a second zone 309 associated with a second range of surface roughness index values bounded by a second lower limit and a second upper limit of surface roughness index, and a third zone 310 associated with a third range of surface roughness index values bounded by a third lower limit and a third upper limit of surface roughness index. In practice, it is understood that the non-overlapping ranges or zones (308, 309, 310) are not limited to any particular geometric shape; is some configurations the resolution of the non-overlapping regions or zones may comprise strips (e.g., of defined lengths in the direct of travel of the vehicle or implement) that are associated with one or more row units 66. The data map 301 of FIG. 3A may be stored in the memory of the data storage device 24 of the data processing system 14 or retrieved or accessed from a data storage device associated with a central server or the cloud via a wireless communications link or wireless communications network.

In one embodiment, the data processor 18 or the ground speed module 59 may estimate a corresponding ground speed setting for each zone (308, 309, 310); and adjust the ground speed (e.g., target ground speed) to coincide with the zone in which the vehicle or its implement is currently traversing such that guidance and tracking of the observed vehicle path is substantially aligned with the target vehicle path (e.g., path plan) with minimal lateral tracking error and reduced deviation. For example, if the target vehicle path comprises a linear path segment or series of parallel linear path segments that are aligned in adjacent rows, the tracking with minimal lateral tracking error tends to reduce fuel consumption of the vehicle and over-application of crop inputs, such as fertilizer, nutrients, nitrogen, potassium, phosphorus, calcium, minerals, pesticides, herbicides, fungicides, seeds and/or rootstock.

As illustrated in FIG. 3A and FIG. 3B, the first zone 308 is illustrated by cross-hatched regions or first strips along the path plan (e.g., for rows 302 and end turns 303) of the vehicle and its implement track; the second zone 309 is illustrated by regions or second strips without any cross-hatch fill pattern; and the third zone 310 is illustrated by cross-hatched regions or third strips along the path plan of the vehicle. For clarity the cross hatched regions of the first zone 308 are oriented in a different direction that the cross-hatched regions of the third zone 310.

FIG. 3B is a plan view of a second illustrative data map 321 of surface roughness zones (308, 309, 310); within a hypothetical field. Like reference numbers in FIG. 3A and FIG. 3B indicate like features or elements. The data map 321 of FIG. 3B is similar to the data map 301 of FIG. 3A, except the data map 321 of FIG. 3B has transition regions 311 between different zones of respective surface roughness index ranges.

Within each transition region 311, the data processor 18, the ground speed module 59 and/or surface roughness index estimator 60 is adjusting or changing the ground speed setting from the target ground speed setting requirements of the previous zone that is just exited to the ground speed setting target requirements of next zone that is about to be entered. The longitudinal dimension (e.g., parallel or coincident to linear segments of rows 302) of the transition region 311 tends to vary with the speed of the vehicle, or its implement, in the direction of travel. The greater the ground speed of the vehicle, the shorter the longitudinal dimension of the transition region, and vice versa.

Figure 4:
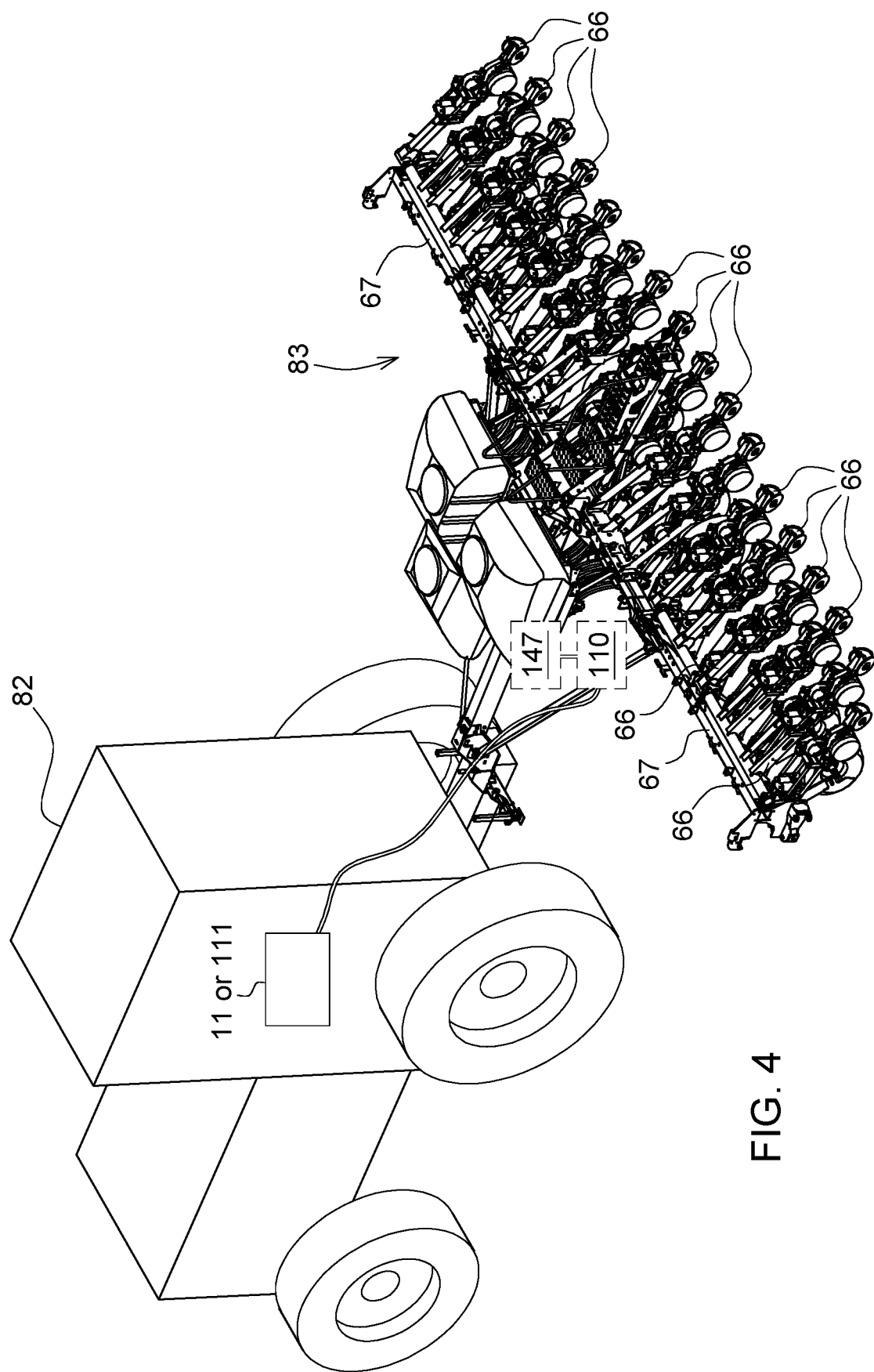
FIG. 4 is a perspective view of a off-road vehicle that is towing a planting implement of multiple row units with a ground speed setting of the vehicle that is adjustable in accordance with a map of surface roughness zones.

FIG. 4 is a perspective view of a off-road vehicle 82 that is towing a planting implement 83 of multiple row units 66, where the vehicle and/or its implement support an adjustable ground speed setting in accordance with a data map (301, 321) of surface roughness zones. Row units 66 are associated with the implement 83 that is coupled to the off-road vehicle 82. For example, during a planting operation, in response to an operator election or activation, via the user interface 22, of automated speed control based on the surface roughness index for a corresponding agricultural task (e.g., tilling, planting, or spraying) and implement configuration, the electronic data processor 18 or the surface roughness management module 60 can establish a task-based surface roughness index limit or range to efficiently operate (e.g., till, plant or spray) at a corresponding variable ground speed setting (e.g., variable target speed, as opposed to a set maximum speed for the entire field), which may be varied as the vehicle enters or leaves different zones associated with different surface roughness index.

FIG. 5 is rear view of a towable sprayer implement 500 with steerable wheels 520, where the implement 500 can be towed by an off-road vehicle via a hitch. The off-road vehicle (e.g., 82 in FIG. 4) can be coupled to the frame 506 or other structural member of the sprayer implement via a hitch, such as a three point pitch. The hitch may be associated with a wiring harness and electric connector between the implement steering controller 510 and the data port 16 or the data processing system 14. The implement steering controller 510 is electrically coupled to the implement steering actuator 509. The implement steering actuator 509 may comprise an electrohydraulic cylinder, a dual piston or dual chamber electrohydraulic cylinder, a linear motor, dual linear motors, an electric motor with a screw gear, dual electric motors with a screw gear, or the like. In one embodiment, the implement steering actuator 509 is secured to the frame 506 by one or more structural supports 519. The implement steering controller 510 is configured to generate, provide and communicate steering gain, steering commands or steering data messages to the implement steering actuator 509.

In one embodiment, the implement steering actuator 509 is operably coupled to the wheel supports 514 for each rotatable wheel 520. Although the wheel supports 514 are illustrated as a hub connected to or integral with a vertical member, other configurations and variations of the wheel supports 514 fall within the scope of a steerable implement. At or near a lower end of the wheel support 514, a spindle or shaft 512 rotatably supports a wheel 520 and is associated with one or more radial bearings. At or near an upper end of the wheel supports 514, the wheel support 514 is rotatably coupled to an arm 516 for rotation 515 with respect to the arm 516 about a substantially vertical axis. In one configuration, the arm 516 and the wheel support 514 have one or more bearings (e.g., axial bearings and radial bearings). Accordingly, the implement steering actuator 509 may impart generally linear movement 518 about a substantially transverse axis via rods and/or a mechanical linkage, which facilitates turning or rotation 515 of the wheel support 514 and, hence, the wheel about the substantially vertical axis.

The arm 516 is linked to the frame 506 via supports 507 (e.g., linkage) and pivot points 508. An upper end of the arm 516 is coupled to a suspension assembly 517. As illustrated, the suspension assembly 517 comprises a coil spring and an shock absorber that are coaxially aligned, although other configurations are possible and fall within the scope of the suspension assembly 517. For example, the coil spring could be replaced by a torsion bar structure or a leaf spring. The suspension assembly 517 dampens vertical movement and allows the arm 516 to move up or down with respect to the frame member 506. Although the above implement steering system 542 is illustrated in the context of an implement 500, the off-road vehicle may incorporate a similar steering system where the implement steering controller 510 and the implement steering actuator 509 are replaced by the steering controller 40 and steering system 42, for example. Further, the above implement steering system 542 of the implement 500 can be used for an implement with two steerable wheels, or an implement with four steerable wheels, where the four steerable wheels essentially doubles the components of the implement steering system 542 and associated wheel suspension. The implement steering system 542 may refer collectively to the components below the frame 506 of the implement 500, for example.

In one embodiment, an electric drive motor 524 is coupled mechanically to each wheel 520 to drive or rotate (e.g., mutually or synchronously) with the wheel 520. The electric drive motor 524 may be coupled to the shaft 512 to drive a wheel hub or rim connected to the wheel, for example. Each wheel 520 may rotate together or separately from the other wheel 520 as commanded or directed by the motor controller 522.

As illustrated in FIG. 5, the electric drive motor 524 is configured as a hub motor that is connected rotatably, directly or indirectly, to the shaft 512. For example, the electric drive motor that is configured as a hub motor may be mounted to the wheel support 514. However, other motor configurations may fall within the scope of the disclosure, such as an electric motor that is linked to the wheel 520 or wheel hub by a drive shaft, a drive shaft with one or more universal joints, or a linkage mechanism to transfer rotational energy between the rotor of the electric drive motor 524 and wheel 520 in a motoring mode, or in a braking mode, or braking/power regeneration mode.

In one embodiment, the motor controller 522 is coupled to one or more electric drive motors 524 to provide control signals to one or more electric drive motors 524, such as alternating current (AC) control signals or pulse-width-modulated (PWM) control signals to control operation of the electric drive motor or motors 524 in a motoring mode, a braking mode, and/or a power generation mode. In one configuration, the motor controller 522 may comprise a dual inverter or a bi-directional, dual inverter that has direct current (DC) input terminals that are coupled to a DC bus or that are fed by the DC output terminals of the propulsion system 46. The motor controller 522 may output one or more control signals (e.g., alternating current (AC) control signals) via insulated or sheathed conductors 526 to control the operation of one or more electric drive motors 524.

In one embodiment, the sprayer portion of the implement 500 comprises the components above the frame 506. As illustrated in FIG. 5, the sprayer portion comprises a container 502 coupled to the pump 503 via a fluid line 504. The pump 503 is coupled via fluid lines 504 to one or more nozzles 505 that are spaced apart along the transverse length of a boom 501. The container 502 stores an aqueous solution, mixture or liquid, such as fertilizer, nutrients, pesticide, fungicide, herbicide, or other crop inputs for dispersing or dispensing via pump 503 to the nozzles 505 via fluid lines 504. In practice, a sprayer controller may be electrically coupled to electrohydraulic valves on each nozzle 505 to control the flow rate, pressure, pattern, activation state, or deactivation state (e.g., pulse-width modulation activation) of each nozzle or set of nozzles 505, where the sprayer controller is coupled to the data ports 16 or data processing system 14 on the off-road vehicle. The boom 501 is supported from the frame 506 by one or more structural members. The boom 501 may comprise a framework of members to reduce its weight and increase its structural strength, such as torsional strength and tensile strength. Although the implement 500 is illustrates as a towed sprayer, the implement may be configured as a planter with steerable wheels, or a cart (e.g., grain cart) or any other towable implement with at least two steerable wheels.

In an alternate embodiment of FIG. 5, a location-determining receiver 110 and a wireless communications device 147 are mounted on or in the implement 500 to provide position or motion data (e.g., implement velocity and acceleration) on the position of the implement with respect to one or more zones associated with corresponding surface roughness ranges.

The method and system of the disclosure is well-suited for accurate estimation and application of target ground speed setting for a vehicle and/or its implement to facilitate proper, precise and accurate steering of the vehicle and/or its implement to track a target path plan, along. For example, as the bumpiness or roughness of ground varies in certain zones or cells of a field or work site, the method and system supports automated and dynamic adjustment of the ground speed or variable grounds speeds the vehicle and/or its, rather than relying upon the operator to manually adjust ground speed or steering commands in response to changing or variable conditions in the field or work site. The method and system is well-suited for dynamically adjusting the variable ground speed settings for the vehicle, its implement or both based on the position of the vehicle, or its implement relative to different surface roughness index zones and corresponding target ground speeds for, or applicable to, the respective agricultural task (e.g., tilling, planting, spraying) being performed by the vehicle, and its implement.

This document describes various illustrative embodiments which can be varied in many ways. Such variations are not to be regarded as a departure from the spirit and scope of illustrative embodiments, and all such variations or modifications as would be obvious to one skilled in the art are intended to be included within the scope of the claims.

The following is claimed:

1. A method and system for estimating surface roughness of a ground for an off-road vehicle to control ground speed, the method comprising:
   detecting motion data of an off-road vehicle traversing a field or work site during a sampling interval, the motion data comprising ground speed of the off-road vehicle;
   detecting pitch acceleration data of the off-road vehicle for the sampling interval;
   detecting roll acceleration data of the off-road vehicle for the sampling interval; and
   determining a surface roughness index based on the detected motion data, pitch acceleration data and roll acceleration data for the sampling interval;
   estimating zones with corresponding surface roughness index ranges within a field or work site based on the determined surface roughness index as a vehicle traverses or traversed the field or work site over multiple sampling intervals;
   generating a graphical display that illustrates the estimated zones of corresponding surface roughness or index ranges within the field or work site; and
   displaying the graphical display to a user or operator of the vehicle.

2. The method according to claim 1 further comprising:
   determining a position of a vehicle, or its implement, in the field or in the work site with respect to the estimated zones of different corresponding surface roughness index ranges; and
   estimating a ground speed setting for the vehicle, its implement, or both, consistent with alignment and/or overlap of the determined position of the vehicle, its implement, or both, and the estimated zones.

3. The method according to claim 2 further comprising:
   controlling a propulsion system or an actuator to adjust the estimated ground speed setting for corresponding zones with a surface roughness index ranges for transitions or changes between different zone limits or zone thresholds.

4. The method according to claim 1 further comprising:
   determining a position of a vehicle, or its implement, in the field or in the work site with respect to the estimated zones of different corresponding surface roughness index ranges; and
   controlling a propulsion system or an actuator to decrease or decrement a present ground speed setting for a present zone with a present surface roughness index range that is greater than a previous range of a previous zone.

5. The method according to claim 1 further comprising:
   determining a position of a vehicle, or its implement, in the field or in the work site with respect to the estimated zones of different corresponding surface roughness index ranges; and
   controlling a propulsion system or an actuator to increase or increment the present ground speed setting for a present zone with a present surface roughness index range that is lesser than a previous range of a previous zone.

6. The method according to claim 1 further comprising:
   collecting image data of the field or work site in a forward field of view of the vehicle;
   estimating a visual surface roughness index for the collected image data within the field of view to establish a transition between different estimated ground speed setting zones; and
   prior to reaching a next transition region, estimating a next ground speed setting for the implement consistent with alignment and/or overlap of the determined position, the estimated zones and the established transition region.

7. The method according to claim 1 further comprising:
   collecting image data of the field or work site in a forward field of view of the vehicle;
   estimating a visual surface roughness index for the collected image data within the field of view to establish a transition between different estimated ground speed setting zones; and
   at the entrance point or beginning of the next transition region, controlling a propulsion system or an actuator to increase or increment the next ground speed setting for one or more primary corresponding zones with a surface roughness index range that is less than a limit of a previous zone threshold that the vehicle, or its implement, is exiting.

8. The method according to claim 1 further comprising:
   collecting image data of the field or work site in a forward field of view of the vehicle;
   estimating a visual surface roughness index for the collected image data within the field of view to establish a transition between different estimated ground speed setting zones; and
   at the entrance point or beginning of the next transition region, controlling a propulsion system or an actuator to decrease or decrement the ground speed setting for one or more secondary corresponding zones with a surface roughness index range that is greater than a limit of the previous zone threshold to transition between the different ground speed settings that the vehicle, or its implement, is exiting.

9. A system for estimating surface roughness of a ground for an off-road vehicle to control ground speed, the system comprising:
   a motion sensor configured to detect motion data of an off-road vehicle traversing a field or work site during a sampling interval, the motion data comprising ground speed of the off-road vehicle;
   a pitch sensor configured to detect pitch angular acceleration data of the off-road vehicle for the sampling interval;

a second sensor configured to detect roll angular acceleration data of the off-road vehicle for the sampling interval;

a surface roughness index estimator for determining a surface roughness index based on the detected motion data, pitch angular acceleration data and roll angular acceleration data for the sampling interval, where the surface roughness index estimator comprises software executable by an electronic data processor; and a user interface configured to display the surface roughness index to a user or operator of the vehicle.

10. The system according to claim 9 further comprising:
a location-determining receiver for determining a position of a vehicle, or its implement, in the field or in the work site with respect to the estimated zones of different corresponding surface roughness index ranges; and a ground speed module or an electronic data processor configured to estimate a ground speed setting for the vehicle, the implement, or both consistent with alignment and/or overlap of the determined position of the vehicle, the implement, or both, and the estimated zones.

11. The system according to claim 10 further comprising:
the ground speed module or the electronic data processor configured to control the vehicle propulsion system, or implement electric drive motor, or both an implement actuator to adjust the estimated implement ground speed setting for corresponding zones with a surface roughness index ranges for transitions or changes between different zone limits or zone thresholds.

12. The system according to claim 10 further comprising:
the ground speed module or the electronic data processor configured to control the vehicle propulsion system, or implement electric drive motor, or both to decrease or decrement a next ground speed setting for a corresponding zone with surface roughness index range that is greater than a limit of a previous zone threshold.

13. The system according to claim 10 further comprising:
the ground speed module or the electronic data processor configured to control the vehicle propulsion system, or implement electric drive motor, or both to increase or increment a next ground speed setting for a corresponding zone with surface roughness index range that is less than a limit of a previous zone threshold.

14. The system according to claim 9 further comprising:
an imaging system for collecting image data of the field or work site in a forward field of view of the vehicle;

a visual surface roughness estimator configured to estimate a visual surface roughness index for the collected image data within the field of view to establish a transition between different estimated ground speed setting zones; and prior to reaching a next transition region, an electronic data processor or a ground speed module configured to estimate a next ground speed setting for the implement consistent with alignment and/or overlap of the determined position, the estimated zones and the established transition region.

15. The system according to claim 9 further comprising:
an imaging system for collecting image data of the field or work site in a forward field of view of the vehicle;

a visual surface roughness estimator configured to estimate a visual surface roughness index for the collected image data within the field of view to establish a transition between different estimated ground speed setting zones; and at the entrance point or beginning of the next transition region, a ground speed module or an electronic data processor configured to control an actuator, a vehicle actuator, or an implement actuator to increase or increment the next ground speed setting for a corresponding primary corresponding zone with a surface roughness index range that is less than a limit of a previous zone threshold that the vehicle, or its implement, is exiting.

16. The system according to claim 9 further comprising:
collecting image data of the field or work site in a forward field of view of the vehicle;

estimating a visual surface roughness index for the collected image data within the field of view to establish a transition between different estimated ground speed setting zones; and at the entrance point or beginning of the next transition region, a ground speed module or an electronic data processor configured to control an actuator, a vehicle actuator, or an implement actuator to decrease or decrement the ground speed setting for a corresponding secondary zone with a surface roughness index range that is greater than a limit of a previous zone threshold that the vehicle, or its implement, is exiting to transition between the different ground speed settings.

* * * * *